United States Patent
Schaffeld et al.

(10) Patent No.: US 8,381,521 B2
(45) Date of Patent: Feb. 26, 2013

(54) VEHICLE PNEUMATIC BOOSTER SYSTEM OPERATING METHOD AND APPARATUS

(75) Inventors: William J. Schaffeld, Brecksville, OH (US); Nicholas Asmis, Seven Hills, OH (US); Mark W. McCollough, Amherst, OH (US); Richard Beyer, Westlake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 332 days.

(21) Appl. No.: 12/783,002

(22) Filed: May 19, 2010

(65) Prior Publication Data
US 2011/0283976 A1    Nov. 24, 2011

(51) Int. Cl.
F02B 33/44    (2006.01)
(52) U.S. Cl. ........ 60/608; 60/605.1; 60/611; 123/559.1; 123/564
(58) Field of Classification Search .............. 60/605.1, 60/608, 611; 123/559.1, 564
See application file for complete search history.

(56) References Cited

U.S. PATENT DOCUMENTS

| | | | |
|---|---|---|---|
| 4,109,623 A | 8/1978 | Rivere | |
| 5,064,423 A | 11/1991 | Lorenz et al. | |
| 7,076,954 B1 * | 7/2006 | Sopko et al. | 60/607 |
| 2004/0139796 A1 | 7/2004 | Beyer et al. | |
| 2008/0033628 A1 | 2/2008 | Guzzella et al. | |
| 2009/0235663 A1 | 9/2009 | Nemeth et al. | |
| 2010/0318268 A1 | 12/2010 | Jager et al. | |
| 2010/0331143 A1 | 12/2010 | Jager et al. | |

FOREIGN PATENT DOCUMENTS

| | | |
|---|---|---|
| DE | 39 06 312 C1 | 12/1989 |
| DE | 199 44 946 A1 | 3/2001 |
| DE | 10 2006 027 865 A1 | 12/2007 |
| DE | 10 2008 000 325 A1 | 8/2009 |
| WO | WO 2006/037564 A1 | 4/2006 |
| WO | WO 2006/089779 A1 | 8/2006 |
| WO | WO 2006/089780 A1 | 8/2006 |
| WO | WO 2009/036992 A1 | 3/2009 |
| WO | WO 2009/103588 A1 | 8/2009 |
| WO | WO 2009/103589 A1 | 8/2009 |
| WO | WO 2009/103590 A1 | 8/2009 |

OTHER PUBLICATIONS

International Search Report dated Aug. 22, 2011 (four (4) pages).
Form PCT/ISA/237 Jul. 2011, Written Opinion of the International Searching Authority (seven (7) pages).

(Continued)

Primary Examiner — Ching Chang
(74) Attorney, Agent, or Firm — Crowell & Moring LLP

(57) ABSTRACT

An apparatus and method for improving vehicle performance by application of pneumatic boost to vehicle engines, including diesel engines having at least one turbocharger supplying air to the engine, in a manner which increases engine torque output while minimizing the potential for exceed various operating limits to the maximum practicable extent. The vehicle's pneumatic booster system controller implements strategies for shaping the rate of the air injection during a boost event, tailoring the air injection to obtain maximum engine torque output while respecting the operating limits, by controlling the timing, duration, quantity and/or injection pattern during a boost event to achieve a refined distribution of compressed air injection over the course of the boost event to provide desired engine torque output and fuel efficiency while minimizing the potential for exceeding a wide variety of operation limits, regulatory, engineering and passenger comfort limits.

28 Claims, 21 Drawing Sheets

OTHER PUBLICATIONS

M. Marx et al., "Improving the Torque Behaviour of Turbocharged Diesel Engines by Injecting Compressed Air", MTZ, Jun. 1, 2009, vol. 70, pp. 30-35.

"Advanced CFD Simulation of a Compressed Air Injection Module", H. Nemeth et al., Conference on Modelling Fluid Flow (CMFF'06), The 13$^{th}$ International Conference on Fluid Technologies, Budapest, Hungary, Sep. 6-9, 2006.

"Turbo Lag Reduction for Improving Commercial Vehicle Dynamics", H. Nemeth et al., 10$^{th}$ Mini Conference on Vehicle System Dynamics, Identification and Anomlies, Budapest, Nov. 6-8, 2006.

"Diesel Engine Response Improvement by Compressed Air Charging", H. Nemeth et al., 11$^{th}$ EAEC Congress, Budapest, Hungary, May 30-Jun. 1, 2007.

"PBS—A New Solution to Improve Dynamic Torque Rise and Emission Behavior of Supercharged Diesel Engines by Electronic Controlled Air Injection", Dr.-Ing. H. Nemeth et al., Knorr-Bremse Research & Development Center, Budapest, 29. lnternationales Wiener Motorensymposium 2008.

"Application of Pneumatic Boost to Commercial Vehicle Engines", Dr.-Ing. H. Nemeth, 1er MTZ Konferenz, Ladungswechsel im Verbrennungsmotor, Stuttgart, Nov. 11, 2007 (with English translation).

International Preliminary Report on Patentability (PCT/IB/326 & PCT/IB/373), including Written Opinion (PCT/ISA/237) dated Nov. 29, 2012 (nine (9) pages).

\* cited by examiner

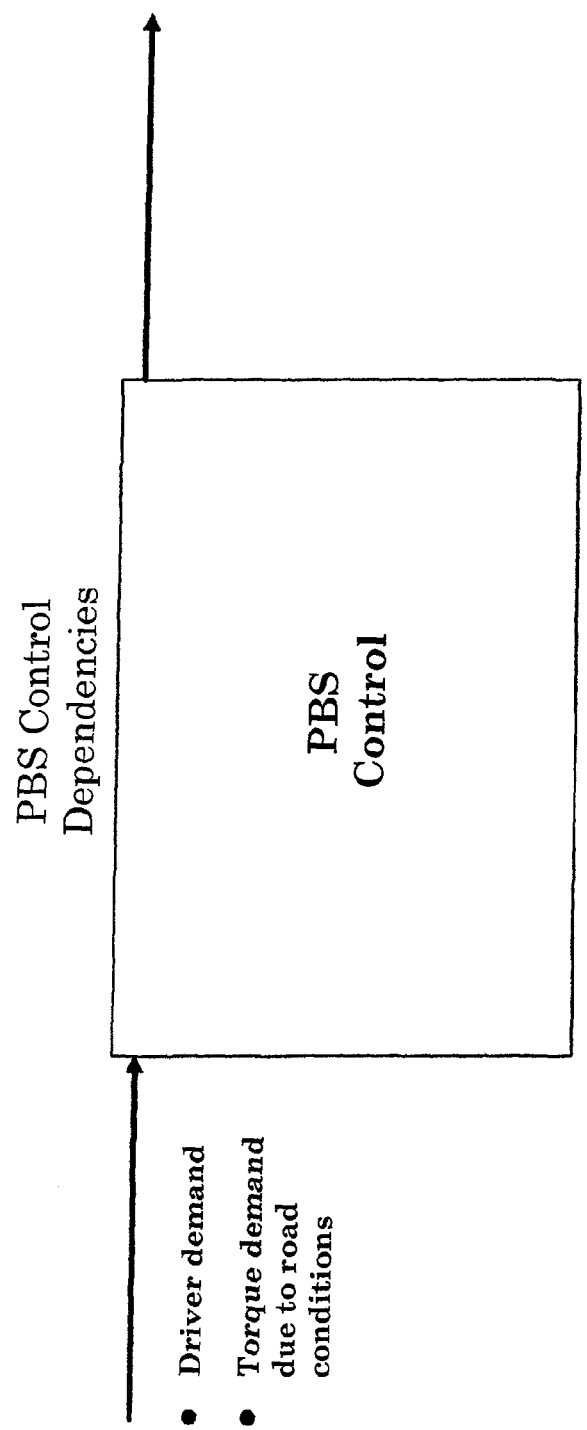

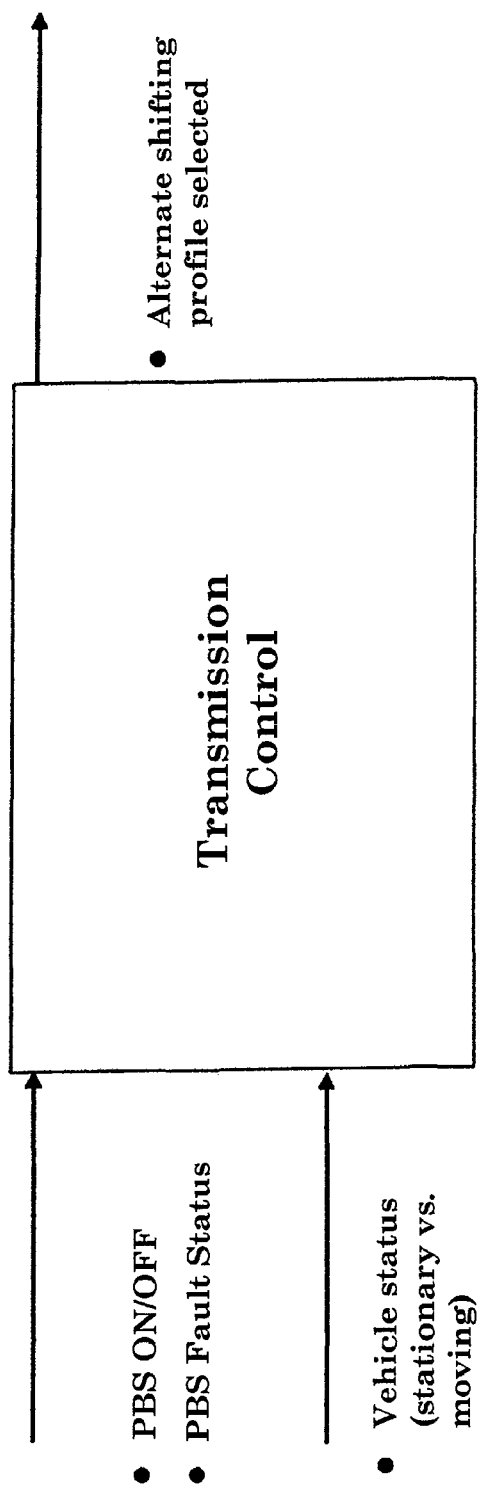

VEHICLE PNEUMATIC BOOSTER SYSTEM OPERATING METHOD AND APPARATUS

The present invention relates to an apparatus and method for improving vehicle performance in a number of areas, including acceleration, fuel economy and emissions reduction. In particular, the present invention relates to an apparatus and method for application of pneumatic boost to vehicle engines, including commercial vehicle diesel engines having at least one turbocharger supplying air to the engine's intake manifold, in a manner which increases engine torque output in a manner which meets design, regulatory and other requirements.

BACKGROUND OF THE INVENTION

Internal combustion engines, such as for example diesel engines, are often fitted with exhaust-gas turbochargers. For example, FIG. 1 shows a schematic illustration of an internal combustion engine 1 having an exhaust line 10 which is coupled to an exhaust-gas turbocharger 2. The exhaust-gas turbocharger has a turbine 4 which is driven by exhaust gas from exhaust line 10. The turbine 4 is coupled to a compressor 3 (together these components form turbocharger impeller unit) which compresses intake air from an intake air inlet 11. The compressed air discharged from the compressor 3 is fed to an intake line 9' for the engine 1 in order to increase the air pressure in the engine 1, and thereby feed more air into the engine's cylinders when the cylinder's respective intake valves are open than would be fed into the cylinders if the engine is naturally aspirated. As a result of the turbocharger's supply of additional air into the engine cylinders, along with associated additional fuel from the engine's fuel injection system, the torque output of the engine is increased and the engine operates at a higher efficiency. Specifically, the additional pressure delivered by the turbocharger to the intake manifold results in greater pressure in the engine cylinder when the cylinder's intake valve closes. The greater mass of air present in the cylinder, when combined with additional fuel and ignited, results in higher combustion pressure, and thus higher piston force to be converted by the engine's crankshaft into higher engine torque output. In addition, the increased combustion mass and pressure generates a higher pressure and volume of exhaust gases, which in turn provides additional energy in the exhaust for driving the turbine of the turbocharger. The increased exhaust energy further increases the rotational speed of the turbocharger compressor and thereby further increases the amount of air being supplied to the cylinders to increase engine speed and torque output at an even more rapid rate. Those of ordinary skill in the art will recognize that although the foregoing and following discusses air for combustion arriving in the engine's cylinders via an intake manifold, the principles and concepts of the present invention are equally applicable to engines having alternative air supply volumes, such as engines in which the intake arrangements are such that each cylinder has an associated intake "chamber," rather than receiving intake air from a common intake manifold.

A well known problem with the use of exhaust-gas turbochargers is that they cannot deliver a sufficient quantity of air in all operating states of the internal combustion engine, most notably in response to sudden acceleration demands at low engine rotational speeds. For example, in engines such as diesel engines having an exhaust-gas turbocharger, during a large acceleration demand the turbocharger typically cannot supply sufficient air flow to generate a desired amount of air pressure in the intake manifold due to the low engine speed and correspondingly low mass flow rate of air intake and exhaust output to drive the turbocharger. As a result, the internal combustion engine reacts slowly, with significant torque output and rotational speed increases occurring only after a notable delay after the accelerator pedal is pressed (an effect known as "turbo lag").

Various solutions have been proposed to ameliorate the effects of "turbo lag," including arrangements in which compressed air is supplied to the intake manifold of the engine. An example of such a "pneumatic booster" system is illustrated in FIG. 1. In this example, reservoir 13 stores compressed air generated by an air compressor 14. The compressed air is introduced into the intake line 9' of the engine 1 in response to a demand for increase engine torque output during the transient period between the start of the acceleration demand and the time at which the turbocharger has built up enough pressure to equalize with the intake manifold pressure and begin to meet the torque output demand on its own.

The additional air supplied into the intake line 9' from reservoir 13 has at least two primary effects. The additional combustion air fed to the cylinders of the engine 1 provides an immediate increase in engine torque output. The additional air also results in a more rapid increase in exhaust gas flow from the engine, which in turn helps the turbocharger turbine 4 to more rapidly increases its rotational speed, thus enabling the turbocharger compressor 3 to build pressure in the intake line 9' faster. Further, the sooner the turbocharger compressor can supply enough pressure to support the torque output demand, the sooner the flow of additional air being supplied from reservoir 13 may be halted, preserving compressed air for other uses and reducing the duty cycle of the vehicle's air compressor.

The injection of compressed air from reservoir 13 in the FIG. 1 example takes place via an intake air control device 7. The intake air control device 7 is arranged between the intake line 9' and either the compressor 3 of the turbocharger, or as shown in FIG. 1 the charge-air cooler 5 downstream from the compressor 3. The intake air control device 7, illustrated schematically in FIG. 2, is connected with an inlet 6 to the charge-air cooler 5 and with an outlet 9 to the intake line 9'.

A flap element 16 is located within the intake air control device 7, between the inlet 6 and the outlet 9. The flap element 16 can be adjusted by an adjusting motor 17 to close off the connection from the inlet 6 to the outlet 9 when compressed air is being injected into the intake line. Closing the flap prevents backflow of injected compressed air toward the turbocharger to help more quickly increase the pressure in the engine cylinders, which in turn increases the exhaust line pressure and resulting rate of turbocharger discharger pressure increase. In addition, closing the flap also provides a closed volume downstream of the turbocharger to further aid in building up the turbocharger discharge pressure.

A compressed air inlet 8 is connected to the outlet 9 to the reservoir 13 via a flow-regulating device 20. A controller 15 serves to control the flow-regulating device 20 and the adjusting motor 17. The control device 15 receives inputs from pressure sensors 18 and 19, which measure, respectively, an outlet pressure at the outlet 9 and an inlet pressure at the charge-air inlet 6.

In operation, the flow-regulating device 20 supplies compressed air to the engine intake manifold by opening the connection from the compressed-air inlet 8 to the outlet 9. At approximately the same time, the flap element 16 is closed to prevent flow of the injected compressed air from reservoir 13 back into the compressor 3 of the exhaust-gas turbocharger. As the injection of compressed air from reservoir 13 is ended, the flap element 16 is opened again to permit the now-sufficient compressed air supply from the discharge of turbocharger compressor 3 to flow into the intake line 9'.

While it has previously been known to inject compressed air into the intake manifold of an engine to reduce "turbo-lag," work in this field has primarily concentrated on maximizing the amount of compressed air available to flow into the engine intake manifold, and on minimizing the response time from the initiation of the pneumatic boost event to the actual injection of compressed air so as to immediately begin to increase engine torque output and avoid undesired operator-perceived delays in delivery of torque from the engine.

One problem with prior pneumatic booster systems is the sometimes very abrupt increase in engine torque output at the beginning of a pneumatic boost event resulting from very rapid compressed air injection. Such sharp engine torque output transients may also be experienced at the subsequent termination of compressed air injection, and when the intake flap is switched open to resume turbocharger output to the engine. These transients can create significant discomfort to the vehicle operator and passengers.

Another problem with previous pneumatic booster systems is that, in the rush to quickly boost engine torque output until the turbocharger has built up sufficient pressure, regulatory limits such as pollution emissions limits may be exceeded. The sudden application of excessive pneumatic boost also has the potential to impose sudden loads on the engine components. For example, sudden application of excessive pneumatic boost can apply a large amount of torque to the vehicle drivetrain which may approach engine, transmission and/or drive axle stress limits. Excessive pneumatic boost may also generate a sudden high volume, high pressure flow of exhaust gases from the engine which can cause the speed of the turbocharger turbine-compressor assembly to rise to high levels. Similarly, sudden compressed air injection and accompanying increased exhaust gas flow can create the potential for over-pressuring the engine's intake air intercooler and its associated piping.

A further problem with previous pneumatic boost systems is the potential for over-injection of compressed air, and consequent depletion of the vehicle's compressed air reserves below the minimum amount needed to ensure operability of critical vehicle safety systems, such as air brakes, as well as other vehicle systems. One approach to minimizing this problem is to procure and install larger air compressors and compressed air storage vessels which are capable of meeting both the needs of critical air-consuming systems and the anticipated additional demands of the pneumatic booster injection system. However, this approach has its own problems, including increased cost and weight penalties for larger and more numerous air handling components, increased fuel consumption due to the increased vehicle weight and the need to consume more of the engine's power output to drive a larger compressor, and space constraints which inhibit the designer's ability to add additional reservoirs.

SUMMARY OF THE INVENTION

In view of these and other problems of the prior art, it is an object of the present invention to provide a pneumatic booster system and operating method which improves vehicle operating performance while ensuring design, operational and regulatory limitations are met during pneumatic boost events. This objective is addressed by a pneumatic booster system which is controlled to implement various strategies for shaping the rate of compressed air injection during a pneumatic boost event by controlling injection during the boost event to alter the "shape" of the compressed air injection on a graph of air injection vs. time. This "rate shaping" approach to compressed air injection during a pneumatic boost event manages pneumatic booster system operations in a manner directly opposite to the prior art's typical approach of injecting as much air as possible, as quickly as possible. Rather, the approach of the present invention is to tailor the timing of the initiation, duration, flow rate, etc. of the compressed air injection to achieve a highly refined distribution of compressed air injection over the course of the pneumatic boost event to improve compliance with a wide variety of operating, regulatory, engineering and passenger comfort limits.

It is to be understood that "rate shaping" in the present invention is not merely slowing the rate of compressed air injection during a pneumatic boost event, but includes a variety of compressed air injection patterns in which the compressed air delivery rate is "shaped" to provide as much engine torque output as possible while avoiding, to the maximum practical extent, exceeding applicable limits. (Alternatively, the rate-shaped air injection may be used to control the rate of torque output change.) Thus, rate shaping is directed to providing variable quantities of compressed air distributed over time, for example, moving the "peak" of the compressed air injection flow rate curve earlier or later in a compressed air injection event, providing multiple "peaks" of compressed air injection delivered over a distributed period, and/or conforming the compressed air injection flow rate to limits defined by real-time monitoring of vehicle parameters.

The rate-shaped compressed air injection of the present invention also may be provided with multiple start/stop events. A preferred approach to providing the desired variable control over the shape of the compressed air injection curve is to use more than one high speed solenoid-controlled air valve in a multi-stage pneumatic booster system. An especially preferred approach is to provide multiple compressed air injection valves having different air flow ratings, and controlling the amount of compressed air injection at any instant during a pneumatic boost event by pulse width modulation ("PWM") of the individual valves' control circuits.

The present invention's ability to monitor vehicle parameters and/or exchange such parameters between system components to enable making compressed air injection adjustments in real time provides a previously unknown level of precision in matching the compressed air injection amount to actual needs, and opens the door to realizing a wide range of benefits.

A first benefit of a vehicle system that is equipped with a rate-shaped pneumatic booster system is that significant fuel efficiency increases may be obtained. The fuel savings result from the use of rate-shaped compressed air injection to improve combustion and exhaust generation to more rapidly get the engine into the engine speed range at which the engine is operating at its most efficient fuel efficiency (often referred to as the engine's "sweet spot") and thereby get the vehicle to the desired cruising speed in the least amount of time, and with the least amount of fuel consumption possible while still avoiding operational, emissions and/or equipment engineering limits.

An additional benefit with the present invention's rate shaping is that the vehicle designer can avoid unnecessary compressed air use and thus decrease the size and cost of the vehicle's installed compressed air generation and storage equipment. Specifically, by injecting only the actual amount of compressed air required to obtain a desired vehicle acceleration while still maintaining compliance with operating limits, and doing so only at the actual times the compressed air is needed during the pneumatic boost event, the present invention can obtain a desired level of engine torque output with less compressed air than typically consumed by previous pneumatic booster systems. The increased precision in compressed air injection decreases the volume of compressed air required during vehicle operations, allowing the vehicle designer to reduce the size of the compressed air generation and storage components to match the lower compressed air demands. These reductions in component size and capacity provide further fuel economy benefits, both due to reduced vehicle weight and due to reduced parasitic energy loss from the vehicle's air compressor.

Another benefit of the present invention's "shaping" of the amount, duration and/or timing of compressed air injection is that direct control of such parameters during a pneumatic boost event can provide indirect control of the responses of various vehicle systems. By selectively tailoring the shape of the compressed air injection rate curve (e.g., a curve formed by graphing air injection mass flow rate vs. time), various vehicle components and systems may be caused to operate in a desired range and/or avoid operating limits while still delivering increased engine torque output to offset at least some, if not all, of the turbo lag. For example, the prior art management of particulate emissions has focused on the precise control of the air-fuel ratio during high acceleration demands starting at low engine speeds (an engine operating point at which exhaust pressure is low) and/or at high engine load conditions. When an insufficient amount of air is available to prevent the air-fuel ratio from becoming overly rich, the resulting combustion process leaves unburned hydrocarbons in the form of particulate matter in the exhaust stream (if in sufficiently high quantity, the particulate matter may be visible as "smoke"). These unburned hydrocarbons may take the form of smoke and/or solid particulates in the exhaust stream. The rate-shaping of the present invention allows for the desired amount of fresh air to be injected to increase the excess air ratio at the desired operating ranges to achieve the desired the air-fuel ratios favorable for reduced particulate matter creation during the combustion process. Another example of the use of rate-shaped compressed air injection to improve compliance with limits is the use of tailored air injection to control NOx formation during high acceleration demands. The in-cylinder reduction of NOx creation during the combustion process has traditionally been handled by exhaust gas recirculation ("EGR"), a process which recirculates a portion of the exhaust gas stream back to the air intake to mix with the incoming fresh air in the cylinder. The inert constituents in the recirculated exhaust gas results in cooler combustion, reducing the in-cylinder temperatures away from the high temperature range associated with NOx formation. EGR flow into the intake supply volume is facilitated when the pressure in the exhaust stream is higher than the pressure in the air intake supply volume (or, more broadly stated, higher than the pressure at whatever point the EGR flow is injected). During a pneumatic boost event in a prior art system, the injected booster air could cause the pressure in the intake to be higher than in the exhaust stream, and thereby inhibit EGR flow. With the present invention's rate-shaped injection, the rate of intake tract air pressure increase, decay, and/or duration may be tailored to permit EGR flow into the intake tract sooner than with prior art systems, to more quickly minimize particulate matter generation and improve emissions compliance. Additionally, calculations and testing have shown that such a rate-shaped injection results in the engine reaching more quickly, and spending more time in, the engine's preferred operating speed range (it's "sweet spot"). This results in more time with the engine operating in conditions favorable for exhaust flow and lower NOx creation during a typical emissions test cycle.

Emission limit excursions are expected to become more problematic with increasingly stringent government regulations expected to come into force in Europe and other regions of the world in the next few years. It is anticipated that in order to meet the upcoming emission reduction requirements, vehicles equipped with convention prior art pneumatic booster systems will be required to resort to generally undesirable exhaust gas after-treatment systems, such as selective catalytic reduction ("SCR") catalysts and related urea injection systems. This additional equipment is expected to bring undesired weight, cost, complexity and maintenance requirement (e.g., urea replenishment) penalties to vehicles equipped with previous pneumatic booster systems.

The present invention's precise rate-shaped control of the timing, duration and amount of compressed air injection provides the opportunity for maximizing compliance with the upcoming more stringent emission limits without the need to resort to additional after-treatment equipment. For example, the amount and timing of the compressed air injection may be adjusted to reduce the amount of particulate matter created during the combustion process. The generation of particulate matter and NOx emissions are inversely proportional in typical diesel engine combustion processes. As engine designers employ methods to reduce NOx emissions to meet ever-more-stringent regulatory limits, particulate matter typically increases. However, because particulate matter generation must also meet regulatory limits, approaches to reduce particulate matter are also needed. One approach to reducing particulate matter is to provide excess air to the combustion chamber. The excess air ratio, $\lambda$ (lambda), may be increased with carefully timed and sized compressed air injections. Calculations and test measurements on engine dynamometers one engines equipped with the present invention's rate-shaped pneumatic booster system have shown on the order of a 15-25% reduction in particulate matter generation during a typical regulatory emissions test cycle. Additionally, since compressed air injection results in more time spent in the engine speed range in which the engine is operating at its maximum efficiency, the exhaust gas pressure is at a higher pressure than it would be in the absence of compressed air injections. This results in a favorable pressure ratio between the exhaust manifold and the intake manifold, promoting the ability to provide satisfactory amounts of exhaust gas recirculation (which helps further suppress NOx formation) more often during a regulatory emissions test cycle. Engine simulations and test measurements on engine dynomometers have shown that exhaust gas recirculation flow may be more quickly re-established to the intake manifold after an acceleration transient by on the order of 3-4 seconds sooner that previously achievable.

A related benefit of the much more precise control over emissions afforded by rate-shaped pneumatic boosting is the potential for reducing the capacity of after-combustion emissions control equipment. For example, the significant reductions in particulate material emissions observed during pneumatic boost event transients would permit downsizing of components such as diesel particulate filters. The reduced component volume eases vehicle component packaging, and reduces costs by minimizing the amount of expensive exhaust treatment materials, such as platinum.

A further benefit of the present invention's rate-shaping approach is to provide enhanced engine braking capability that permits smaller, more efficient engines to be used, while still providing engine braking at levels comparable to that provided by larger engines. Decompression braking is widely used in commercial vehicle diesel engines to improve braking performance. In decompression braking, the engine is used to create a significant drag on the driveline to keep the vehicle combination at reasonable speeds during long down grade driving profiles. To do this the engine is essentially operated as an air compressor by limiting the fueling to the engine and carefully timing the release of pressure from the engine cylinders (i.e., after the pistons have converted energy taken from the drivetrain into work by compressing the intake air, releasing the compressed air by opening a pressure release valve as the piston approaches TDC (top dead center). The release of the pressure in the cylinder near TDC prevents the compressed air from returning its energy to the piston during the piston down stroke.

In the push to get better fuel economy out of engines, one solution is to have smaller, more powerful engines to do the job of the previous engines. However, while smaller engines may be designed to provide a desired high level of horsepower and torque, they cannot provide an amount of decompression braking as large as the previous larger displacement engines (decompression braking performance being correlated to the swept volume of the engine's cylinders). As a result, in the absence of further measures, the use of a smaller engine creates an associated higher burden on the foundation brake system (i.e., the wheel brakes), as more of the braking must be performed by the foundation brakes to compensate for the smaller engine's decreased decompression braking capability.

A rate-shaped injection of compressed air from a pneumatic booster system offers a potential solution to the problem of inadequate decompression braking associated with use of smaller engines. Specifically, the pneumatic booster system may be used to inject additional air into the intake manifold during at least certain portions of a decompression braking demand event to increase the amount of intake air charged into the cylinder as the piston is descending in the cylinder. During the piston's subsequent compression of this increased mass of intake air, more work must be performed as the piston moves to TDC, extracting additional energy from the drivetrain, similar to the amount of energy taken from the drivetrain by a larger displacement engine. This effectively allows the smaller engine to increase its "braking output" by on the order of 50%, helping meet end-customers' desires for improved fuel efficiency (with smaller engines) while still maintaining foundation brake performance and longevity.

Further benefits of the use of pneumatic booster system operation to enhance decompression braking include the option to optimize pneumatic booster system and the associated turbocharger arrangements, for example to use a rate-shaped compressed air injection which is sparingly used only to the extent necessary to spin an "oversized" turbocharger enough to permit the turbocharger to generate a majority of additional air to be provided to the engine cylinders to enhance the decompression braking.

An alternative approach to providing additional decompression braking would be to engage a clutch of an engine-driven air compressor during a braking event to use the generation of air to be supplied to the pneumatic booster system to improve the decompression brake performance (preferably, using a compressor sized larger than normal to create additional drag on the engine during decompression braking).

The present invention may utilize real-time sensing of parameters such as exhaust gas oxygen sensor output, exhaust pressure, fuel injection rate, etc., coupled with high speed electronic control units, to monitor and control emissions-related parameters and compare such parameters to stored "maps" of expected and previously measured emissions at various vehicle drivetrain operating points. Using this real-time information, the present invention's pneumatic booster system controller may then further "scale" or otherwise re-shape the compressed air injection flow amount, duration and/or timing to provide a refined air injection pattern which gives the maximum engine torque output within relevant emissions or vehicle operation limits (e.g., NOx and/or particulate emission limits and/or maximum equipment stress levels). Using such rate-shaped refinement, preliminary calculations and testing indicate that vehicles equipped with the present invention's rate-shaping pneumatic booster system will provide nearly the same engine torque output and vehicle acceleration performance as vehicles equipped with conventional pneumatic booster systems, yet provide sufficient control of vehicle emissions to avoid the need for additional emissions control equipment and its associated cost, weight and maintenance penalties.

An additional objective of the present invention is to provide a pneumatic booster system with rate shaping which permits flexibility in tailoring a vehicle's drivetrain performance and emissions performance to suit the needs and/or demands of individual customers. For example, in contrast to vehicles in which the present invention's rate shaping is optimized to minimize emissions without the need to resort to additional after-treatment equipment, if a vehicle system employs after treatment devices to meet NOx requirements, the present invention's rate shaped compressed air injection may be optimized in other ways, such as by maximizing fuel economy, minimizing particulate emissions, and/or delivering greater engine torque output (made possible by relaxation of particulate matter and NOx emission limits that would have had to be maintained in the absence of SCR converters).

Further objectives of the present invention include providing pneumatic booster system components and operating strategies which permit the pneumatic booster system to coordinate its operations with other vehicle components. Such coordination enables a variety of potential benefits, including making additional engine torque output available sooner by coordinating air injection and fuel injection, and enabling use of smaller, more fuel efficient engines by coordinating pneumatic boosting with use of a transmission controller which controls gear shifting strategies which make optimum use of the engine torque made available by the rate-shaped compressed air injection. As to the former, previously, emissions controls primarily relied on control of the amount of fuel being injected into the engine and/or the amount of exhaust gas recirculation being provided to the combustion chamber, based on reactive measurement of the amount of incoming air. As a result, in vehicles equipped with previous pneumatic booster systems, delays in obtaining increased engine torque output could occur at the beginning of a pneumatic boost event because, regardless of the amount of increased air injection, the fuel injection system could not add additional fuel quickly enough to the engine to match the increased air injection. Without the fuel needed to match the additional air, there would be no significant increase in engine torque output, and it became difficult to maintain the proper air-fuel ratio and amount of recirculated exhaust gas to avoid emissions excursions.

In contrast, when a pneumatic boost event is demanded by an operator of a vehicle equipped with the present invention, the pneumatic booster controller may be programmed to coordinate its operations with the engine's fuel injection controller, for example by sending signals to the fuel injection controller to provide a real-time indication of the amount of the incoming compressed air injection. In this "proactive fueling" approach, the fuel injection controller can immediately begin tailoring the fuel injection to precisely match the amount of air reaching the engine's combustion chambers, without having to wait for the response of other vehicle sensors to inform the fuel injection controller that additional fuel is needed.

Similar communications from the present invention's pneumatic booster system controller with other vehicle components may provide further benefits. For example, as the rate-shaping pneumatic booster system controller is informing the fuel injection controller of the rate-shaped compressed air injection strategy to be executed, the pneumatic booster system controller may provide the transmission's electronic shift controller with information about the air injection event, and/or provide a signal to the transmission controller telling the controller that the transmission may be shifted in a different manner. The communications may include information on the planned and/or actual compressed air injection rate profile itself, from which the transmission controller may make a determination as to whether and how it should alter the transmission's gear shifts. Alternatively, the pneumatic booster system's controller may provide the transmission controller with specific direction, for example to shift to a higher gear sooner than usual, or to use a different shift profile, such as shifting in a manner which "skips over" one or more intervening gears (e.g., a shift from second gear to fifth gear). Such early upshifts are made possible by the increased engine torque output made available by the rate-shaped compressed air injection and earlier, more precise fuel injection. By shifting to higher gears sooner than would otherwise be done in a non-boosted event, the engine is permitted to spend more time operating in its most efficient operating range, reducing fuel consumption. Preliminary calculations and testing indicate that early shifting and skip-shifting provide notable fuel economy increases, while resulting in vehicle time-to-speed performance that is only slightly slower than that obtainable with a previous pneumatic booster system.

It is a further object of the present invention to provide improved operator and/or passenger comfort during pneumatic boost event transients. By monitoring the vehicle's operating parameters, such as wheel speed obtained from a wheel speed sensor (from which acceleration may be calculated) the pneumatic booster system's controller may determine that a desired maximum acceleration rate has been or is about to be exceeded, and adjust the compressed air injection to maintain the vehicle acceleration at or below a predetermined acceleration threshold.

Such events may also be used for adaptive learning by the pneumatic booster system controller. For example, by observing the vehicle's reaction to the compressed air injection during a pneumatic boost event, the controller may scale or otherwise shape the compressed air injection in the same and/or a subsequent pneumatic boost event to minimize the possibility of exceeding an operational limit. For example, observation of a vehicle's reaction to the compressed air injection may be used to deduce whether the vehicle is in a loaded vs. unloaded state, and/or to detect bob-tailing. In response, the pneumatic booster controller may automatically employ a different compressed air injection profile better suited to the current vehicle operating condition, or alternatively may provide an indication to the driver, who could then, for example, operate a manual selection switch to activate a different injection profile.

The present invention's ability to shape the parameters of the compressed air injection provides the operator with the ability to "tailor" the vehicle's responses to the operator's acceleration demands. In one embodiment of the present invention, the operator may be provided with controls such as switches or a system programming device which would allow the operator to set personal preferences, such as emphasizing acceleration or emphasizing fuel economy, to suit the operator's needs and/or desires. The present rate-shaping approach thus, in essence, allows one set of vehicle equipment to be adapted to become "different things to different users." The present invention may also provide the operator with various indications regarding the operation of the pneumatic booster system and/or guidance as to how to improve vehicle performance, for example, providing a signal (visual, sound and/or other signal, such as a haptic signal) which indicates when the pneumatic booster system has made an early upshift possible.

Another object of the present invention is to provide a method of estimating vehicle loading and vehicle mass for use, for example, by electronic stability and anti-rollover systems to automatically adapt in real-time to changes in vehicle configuration, such as changes in cargo or passenger loading. The pneumatic booster system controller can receive information from various vehicle sensors and/or vehicle parameter signals, for example, by monitoring the vehicle's CAN (controller area network) bus. Based on the monitored signals observed during a current pneumatic boost event (for example, monitored engine torque output and/or vehicle acceleration signals), the pneumatic booster system controller may compare the vehicle's current response to the current compressed air injection against the vehicle's response in a previous pneumatic boost event. This comparison would provide a basis for deriving an estimate of the current mass of the vehicle, or at least an estimate of the relative change in vehicle mass from a previous loading state which may then be passed on to other vehicle controllers. The derived mass information would be useful not only to other vehicle systems (such as a stability or ABS system), it could also be used by the pneumatic booster system controller itself to adaptively learn the vehicle's current mass so that in subsequent pneumatic boost events the compressed air injection may be further refined to maintain a desired level of vehicle performance while getting as close as possible, but not exceeding, applicable operational limits.

Alternatively, if the effect of addition or removal of mass from the vehicle provides an additional safety margin before reaching a regulatory or other operational limit, the adaptively-learning pneumatic booster controller can scale or otherwise adjust the compressed air injection in the next pneumatic boost event to compensate for the change in vehicle mass, i.e., consuming the newly-available safety margin in order to optimize another aspect of vehicle performance. For example, if compressed air injection was limited to a given compressed air injection curve shape at one vehicle weight in order to minimize the potential to exceed an emission limit (NOx, particulate matter, carbon monoxide, carbon dioxide and/or others), and a change of vehicle weight increased the margin available before the emission limit would be exceeded, the pneumatic booster system controller could allow increased compressed air injection to increase engine torque output to optimize vehicle acceleration performance, at least up to the point that the emission limit would be again approached.

In another embodiment of the present invention, adaptive learning may be used to identify the presence or absence of various components on a vehicle. The pneumatic booster system controller could then alter its compressed air injection rate shaping to suit the presence (or absence) of the identified component. For example, by monitoring the response of various vehicle parameters via the vehicle's CAN bus, such as the rate of air pressure increase downstream of the turbocharger compressor as measured by pressure sensors measuring air pressure in the intake, the pneumatic booster system controller may determine from the vehicle's response to one or more pneumatic boost events whether the turbocharger impeller is a light metal impeller (such as an impeller made of titanium), or is a heavier impeller with a higher moment of inertia, such as a steel impeller. Similarly, comparisons of the response of the vehicle and its components in previous pneumatic boost events and in a current pneumatic boost event may be used to assess the current wear state of the engine and other vehicle drivetrain components. Also, the pneumatic booster system may be programmed to interpret fault indications received from the pneumatic booster system itself and/or other vehicle systems, and accordingly adapt its pneumatic boost injection profiles to accommodate the fault while still providing as much additional engine torque output as possible within the constraints of the fault (for example, decreasing or delaying the boost injection profile to a "fail-safe" level when a sensor is not providing needed information).

Another objective of the present invention is to provide for improved fuel economy and vehicle acceleration response by providing for rate-shaped compressed air injection in coordination with transmission shifting. When a transmission is upshifted, the engine speed may drop to a lower rpm level, typically considerably below the rpm at which the engine operates with maximum efficiency and generates maximum torque. Either in response to an upshift, or in response to communications between the pneumatic booster system controller and the transmission's controller immediately prior to an upshift, the present invention's pneumatic booster controller may initiate a brief pneumatic boost event to more rapidly return the engine speed back up into the engine's maximum efficiency operating range.

A further objective of the present invention is to provide a pneumatic booster system with rate shaping which has sufficiently precise compressed air injection control to allow the pneumatic booster system to assist in emissions treatment component regeneration, while continuing to maintain vehicle and emissions performance during the regeneration transient. In such an embodiment, when a component such as a particulate filter or an NOx trap requires regeneration, a rate-shaped compressed air injection may be performed to provide the necessary environmental conditions within the emissions treatment component during the regeneration process. The precision of the compressed air injection enabled by the present invention's rate shaping approach, coupled with close coordination by the pneumatic booster controller with other vehicle controllers (such as the fuel injection controller), allows treatment component regeneration to proceed without a notable decrease in vehicle performance and without exceeding emissions limits.

In another embodiment of the present invention, the pneumatic booster system's rate shaping may be altered based on anticipated driving needs. For example, using inputs from a Global Positioning System (GPS) sensor the pneumatic booster system controller may determine likely drive train performance demands based on upcoming route and elevation changes, and alter the compressed air injection rate profile, as well as shifting strategies, in anticipation of greater or lesser engine torque output demands.

A further objective of the present invention is to provide a pneumatic booster system in which rate shaping is used to actively protect vehicle components. For example, in addition to the above-discussed protection against over-pressurizing the intercooler, rate shaping of the compressed air injection rate in conjunction with the pneumatic booster system's throttle valve may be used to produce pressure conditions downstream of the turbocharger compressor which minimize turbocharger surging. Further by injecting only a rate-shaped amount of compressed air necessary for a given engine operating point, the turbocharger is less susceptible to over-speeding. Accordingly, the likelihood of movement into a surge state is greatly reduced. In another example, a rate-shaped injection of relatively cool compressed air may be used to reduce engine and/or exhaust component operating temperatures. Further, operating parameters may be monitored to both protect equipment and to minimize undesired emissions. For example, by monitoring engine operating temperature, the pneumatic booster controller may select a rate-shaped pneumatic boost profile that is tailored to accommodate the operating constraints on an engine which has not reached normal operating temperature (constraints including cold equipment stress limits and excess emissions generated during below-normal combustion chamber temperatures).

The present invention may be provided in the from of discrete components, such as separate pneumatic booster system, engine and transmissions controllers, or may be provided in an integrated electronics package. Further, the physical components of the pneumatic booster system may be separate, stand-alone components, or may be integrated into a pneumatic booster system module, and preferably may be integrated into a module which contains all of the intake air flow control elements, including, for example, compressed air injection control solenoids, intake passage flow control flap, throttle valve, pressure sensors, EGR injection port and integrated electronics and associated CAN bus connections.

Other objects, advantages and novel features of the present invention will become apparent from the following detailed description of the invention when considered in conjunction with the accompanying drawings.

BRIEF DESCRIPTION OF THE DRAWINGS

FIGS. 16a and 16b are diagrams identifying control inputs and outputs associated with communications between a transmission controller and a rate-shaping pneumatic booster system controller in accordance with an embodiment of the present invention.

DETAILED DESCRIPTION OF THE DRAWINGS

Figure 1:
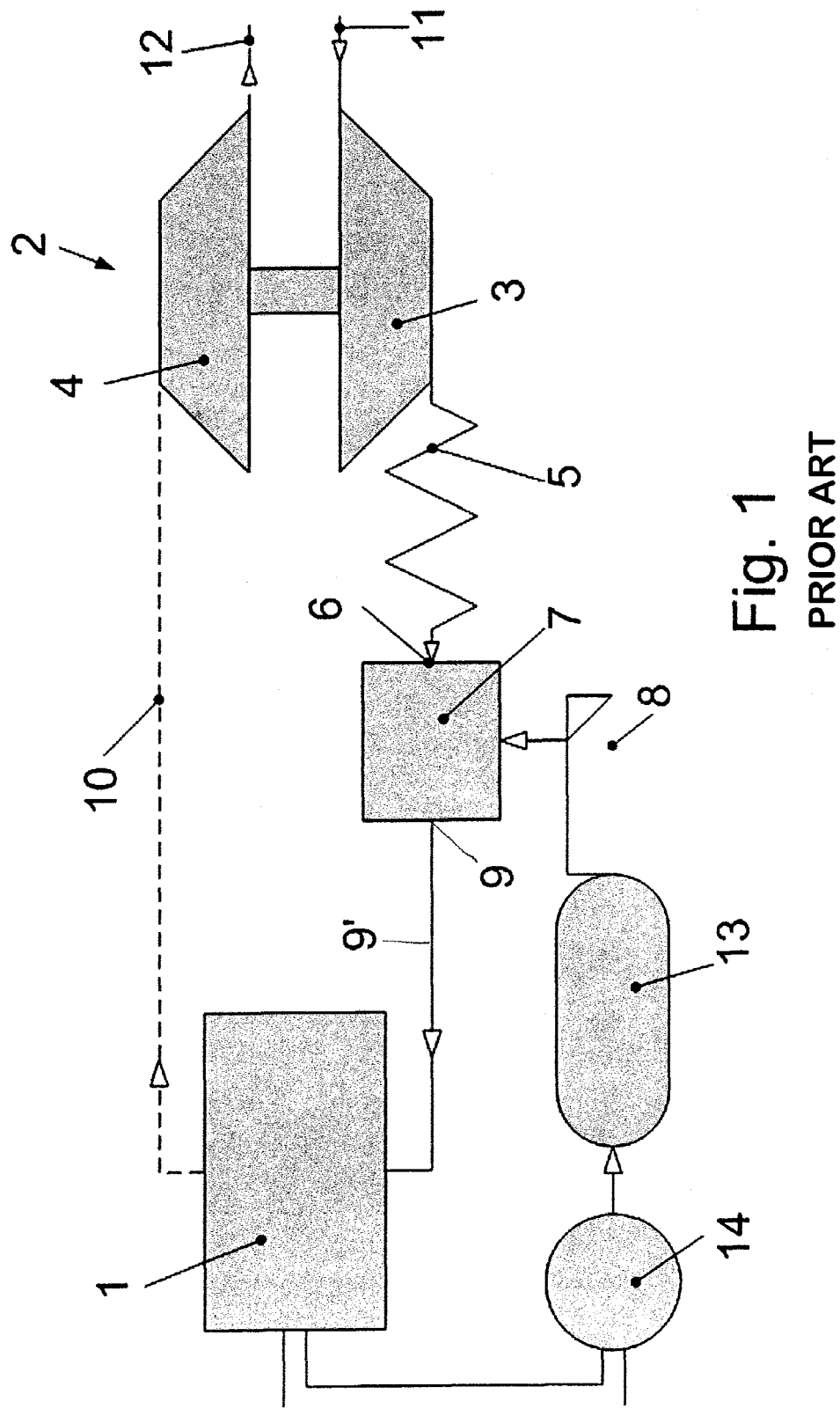
FIG. 1 is a schematic illustration of a prior art turbocharged engine having a pneumatic booster system.
Figure 2:
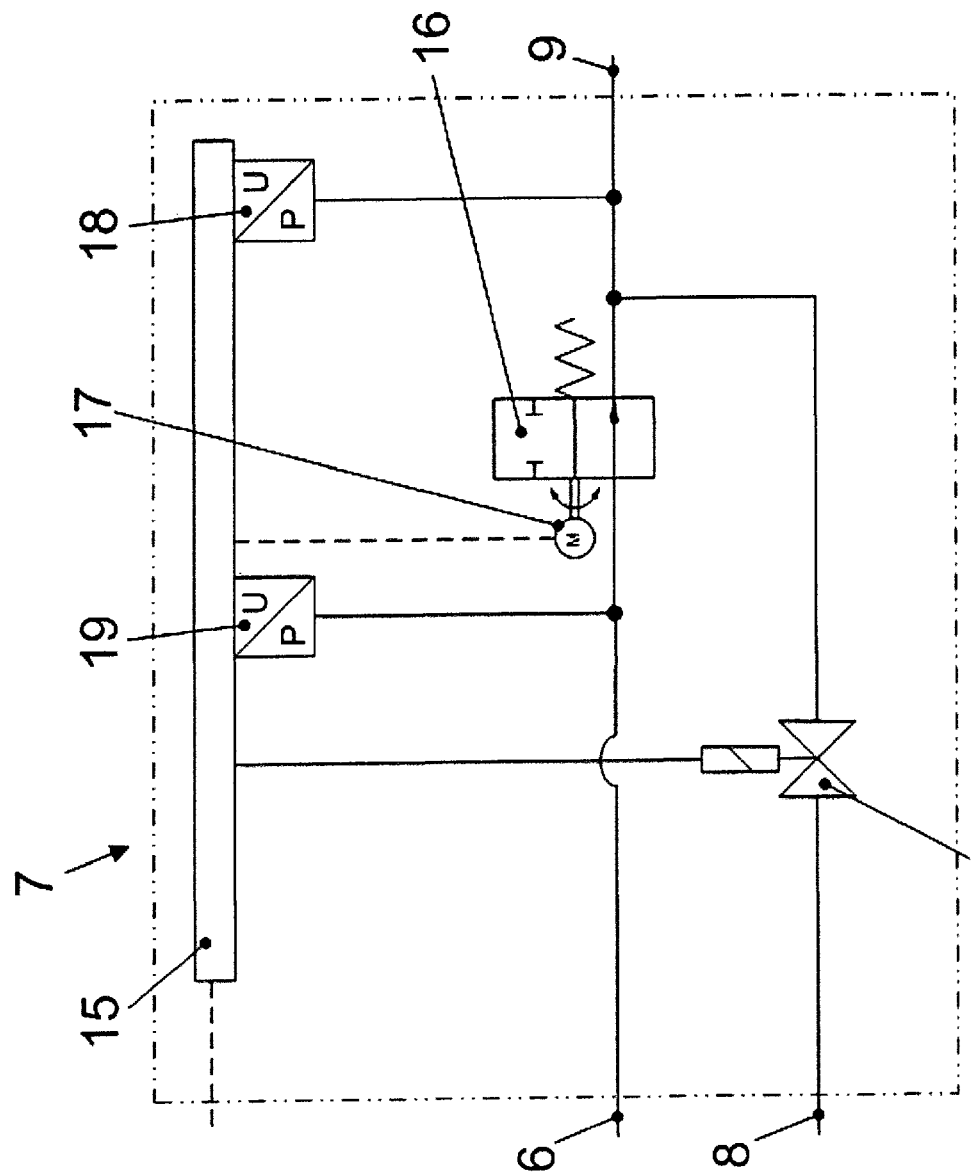
FIG. 2 is a schematic illustration of the intake air control device of the FIG. 1 prior art pneumatic booster system.
Figure 3:
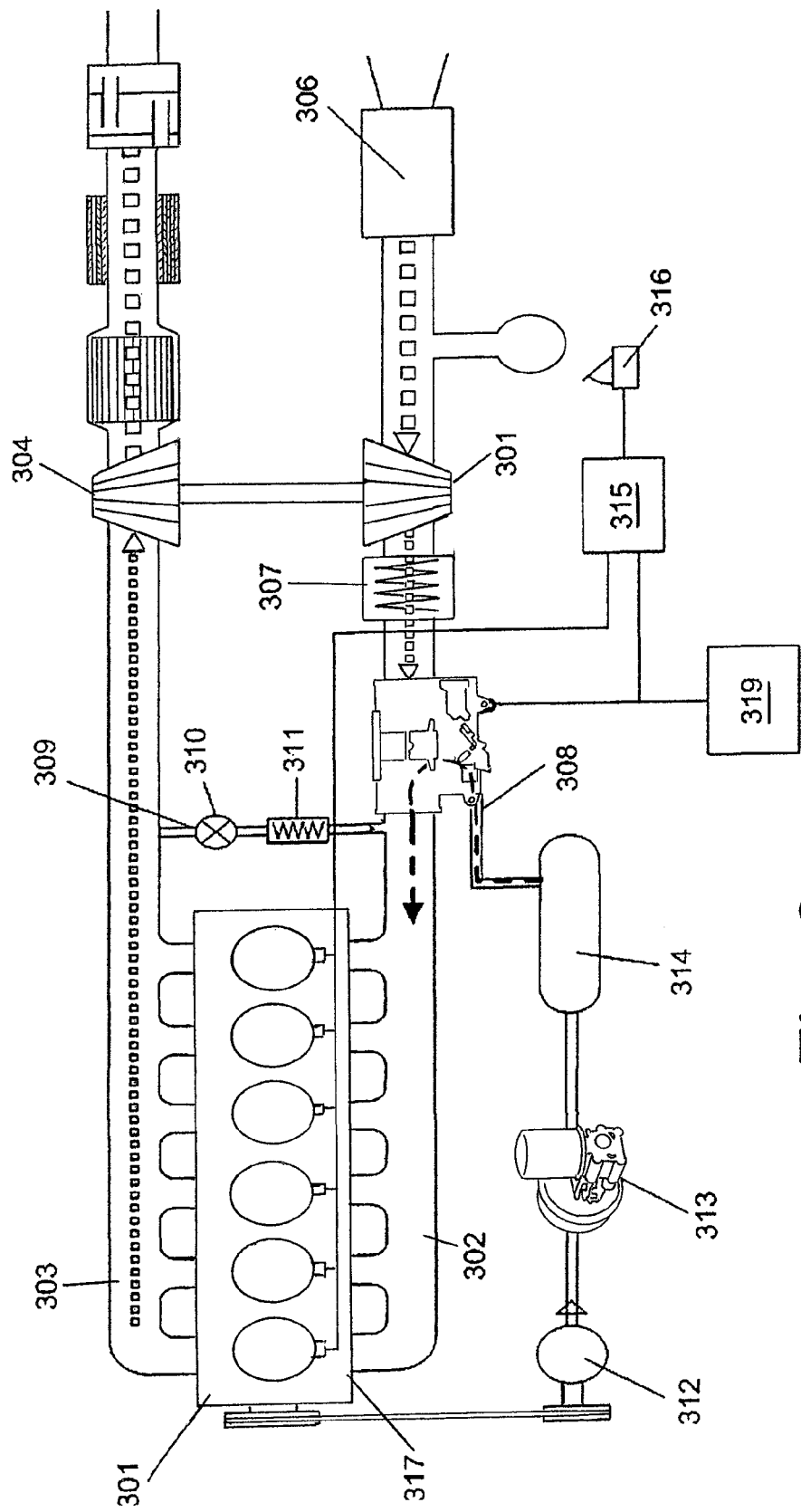
FIG. 3 is a schematic illustration of an engine and related vehicle components in accordance with an embodiment of the present invention.

FIG. 3 shows components of an embodiment of the present invention, including an engine 301 which receives combustion air from intake manifold 302 and releases exhaust gases to exhaust manifold 303. The exhaust gases flow from exhaust manifold 303 to a turbine 304 of an exhaust turbocharger. The exhaust gases cause the turbocharger turbine 304 to drive a corresponding intake air compressor wheel 305 (collectively, the turbocharger impeller) to compress air entering the intake via intake housing 306 (in this embodiment, an air cleaner housing). The compressed air discharged from the turbocharger passes through an intercooler 307 to lower the compressed air's temperature, and then passes through air control device 308 to the engine's intake manifold 302. Exhaust gases also flow from exhaust manifold 303 through exhaust gas recirculation line 309 to intake manifold 302 via EGR control valve 310 and EGR cooler 311. The EGR control valve 310 is operated as needed to provide exhaust gas flow to the intake to minimize formation of NOx during combustion.

This embodiment also includes an air compressor 312 which is driven by the engine via a belt and pulley arrangement from the crankshaft of the engine 301. The present invention is not limited to engine-driven compressed air sources, however, and may be provided compressed air from any suitable source. The compressed air generated by air compressor 312 is, in this embodiment, is sent to an air control valve and dryer 313. The dried air is then directed to downstream compressed air consumers, including compressed air storage reservoir 314. While dried air is used in this embodiment, dried air is not required in the present invention.

Control over the operation of the engine 301 is managed by engine controller 315, which monitors signals from a variety of sensors, including accelerator pedal 316, and issues fuel injection commands to fuel injectors 317 to provide fuel in the appropriate quantity to the engine. In addition to the sensor inputs received by the engine controller 315, the engine controller 315 may exchange data with other vehicle control modules, including modules connected by the vehicle's CAN bus network, such as transmission controller 319 and pneumatic booster injection controller 318 (illustrated here as integrated into air control device 308).

Figure 4:
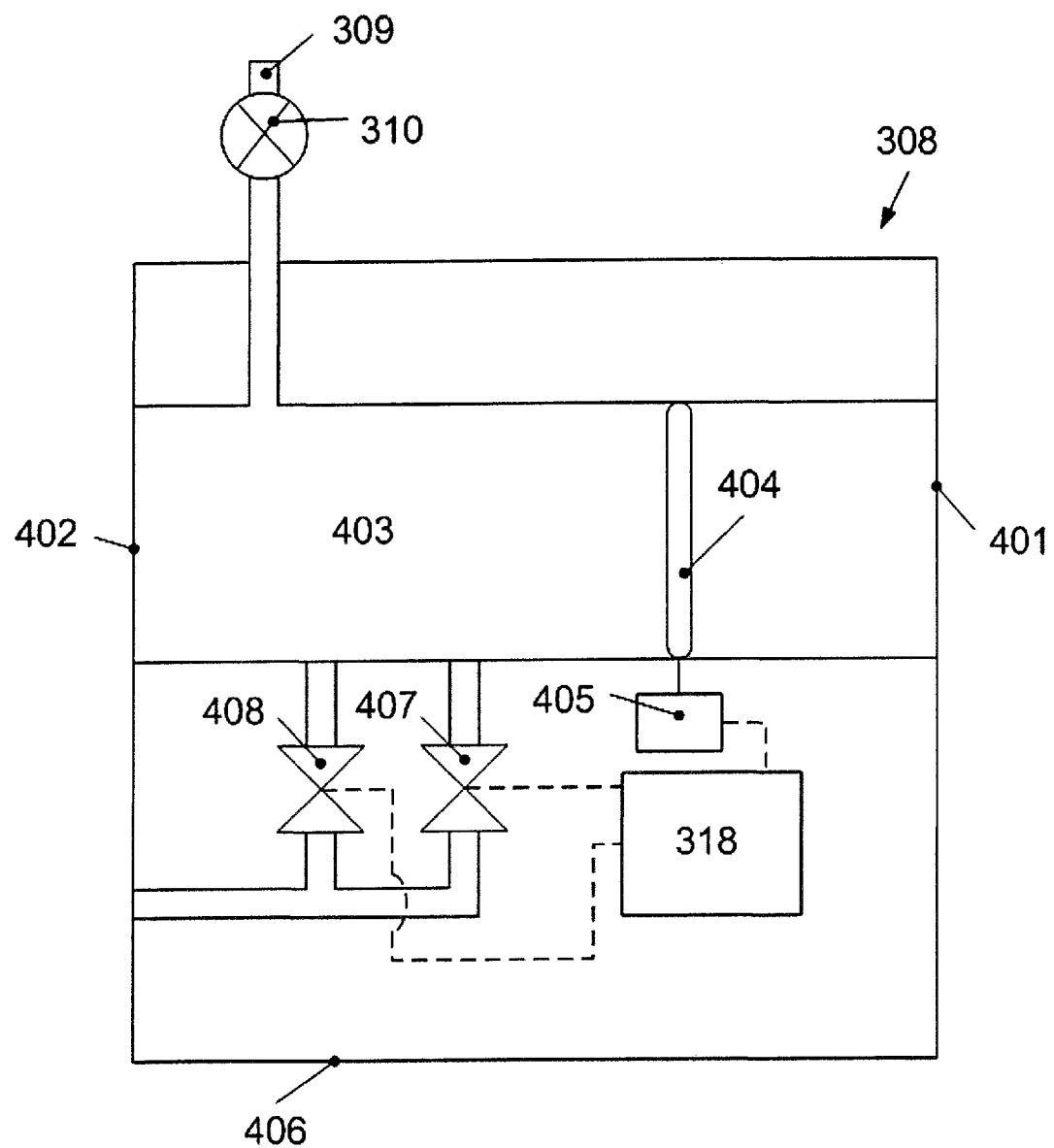
FIG. 4 is a schematic illustration of the air control device of the embodiment illustrated in FIG. 3.

FIG. 4 is a schematic illustration of the primary features of air control device 308. These features include device inlet 401, outlet 402 and air passage 403 therebetween. An intake block-off element, air passage block-off flap 404, is arranged in the air passage 403 to block off air flow from the turbocharger compressor 305 through the air control device 308. The flap 404 is driven by an actuator 405 which is capable of generating very high flap closure and opening rates, as well as being capable of positioning the flap 404 at any position between its full open and full closed positions. The operation of the actuator 405 is controlled by pneumatic booster injection controller 318, which in this embodiment is integrated into the housing 406 of the air control device 308. In addition to flap 404, the air control device 308 also contains two solenoid-operated compressed air control valves 407, 408 which control the flow of compressed air from air storage reservoir 314 into air passage 403 and intake manifold 302. (Two control valves are used in this embodiment, however, the present invention is not limited to two valves.) Preferably, the air control valves 407, 408 are sized to have different compressed air flow rates, for reasons discussed further below. Optionally, the air control device 308 may be configured to receive an intake end of EGR line 309. The outlets of the compressed air valves 407, 408 and the EGR line 309 are located downstream of the flap 404 so that the gases from these air and exhaust passages may be introduced into the intake manifold 302 without being blocked by the flap 404.

Pneumatic Boost Event Initiation and Deactivation.

Figure 5:
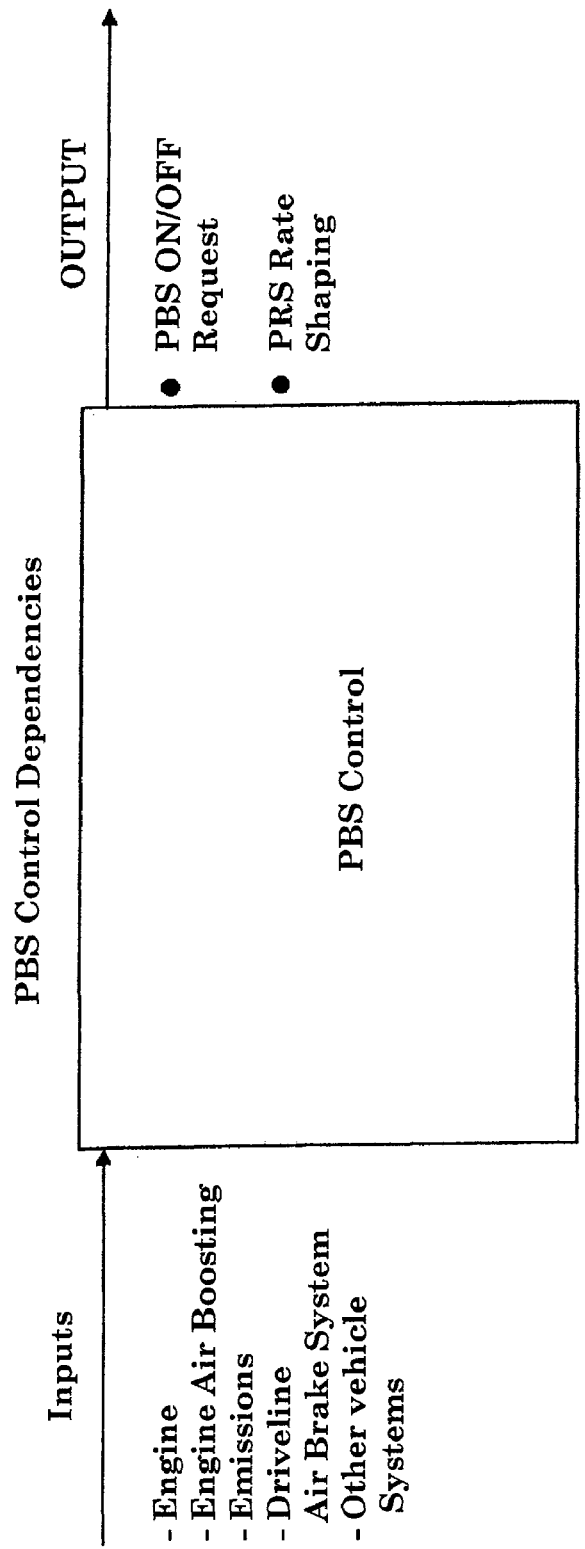
FIG. 5 is a diagram identifying control dependencies for initiation and deactivation of a pneumatic boost event in accordance with an embodiment of the present invention.

The following describes criteria and logic flow for the initiation of a pneumatic boost event in an embodiment of the present invention, with reference to FIGS. 5-8. As shown in FIG. 5, a number of inputs are received by the pneumatic booster system controller, either from a CAN bus connection or separate communication links. These inputs include, for example, (i) engine status and parameter information received from, e.g., the engine controller and/or directly from engine-related sensors, (ii) information in the boost state of the engine from, e.g., the engine controller and/or pressure sensors in the intake tract, (iii) vehicle emissions performance information obtained, e.g., directly from exhaust sensors and/or other control modules, (iv) air brake system status information from, e.g., sensors (such as a compressed air storage reservoir pressure sensors, a brake pedal position sensor and/or a wheel speed sensor), a vehicle brake controller and/or a vehicle stability control system controller, and (v) other vehicle equipment status information (such as air compressor engaged/disengaged status and/or other power take-off equipment operating state).

Preferably, input parameters to be considered in the evaluation of pneumatic boost event activation and deactivation include engine speed, intercooler pressure (a measure of air boost status), pressure present in the pneumatic booster system's compressed air supply, accelerator pedal position and position rate of change (and/or alternatively, frequency of acceleration position exceeding a predetermined position), and the transmission gear, clutch state and current shifting status (i.e., upshifting or downshifting). At a minimum, knowledge of intake manifold pressure and accelerator pedal position is needed, however alternative and/or supplemental inputs include: for engine-related information, turbocharger rpm engine torque output, engine load, coolant temperature and exhaust gas mass flow rate; for engine air boosting-related information, intake manifold pressure, intake pressure measured in the intake tract upstream of the intake manifold and the intake air mass flow rate; for emissions-related information, EGR mass flow rate, DPF (diesel particulate filter) regeneration state and NOx after-treatment system availability (e.g., status of exhaust line SCR and/or NOx absorber components); for air brake system information, status of anti-lock brake system activation (in the case of tractor-trailer vehicles, preferably the ABS status of both the tractor and the trailer brakes), brake pedal position, parking brake status and trailer stability status; for other vehicle systems, the vehicle ignition status and cruise control status. It will be readily apparent to those of skill in the art that the foregoing is an illustrative, but not exhaustive, listing of parameters and system status indications which may be considered as inputs to the pneumatic booster system controller for determining whether to activate or deactivate a pneumatic booster system, and that in the course of implementation of an embodiment of the present invention the system designer will determine from each vehicle's various available parameter and system status sources which inputs will be provided to the pneumatic booster system controller.

Figure 6:
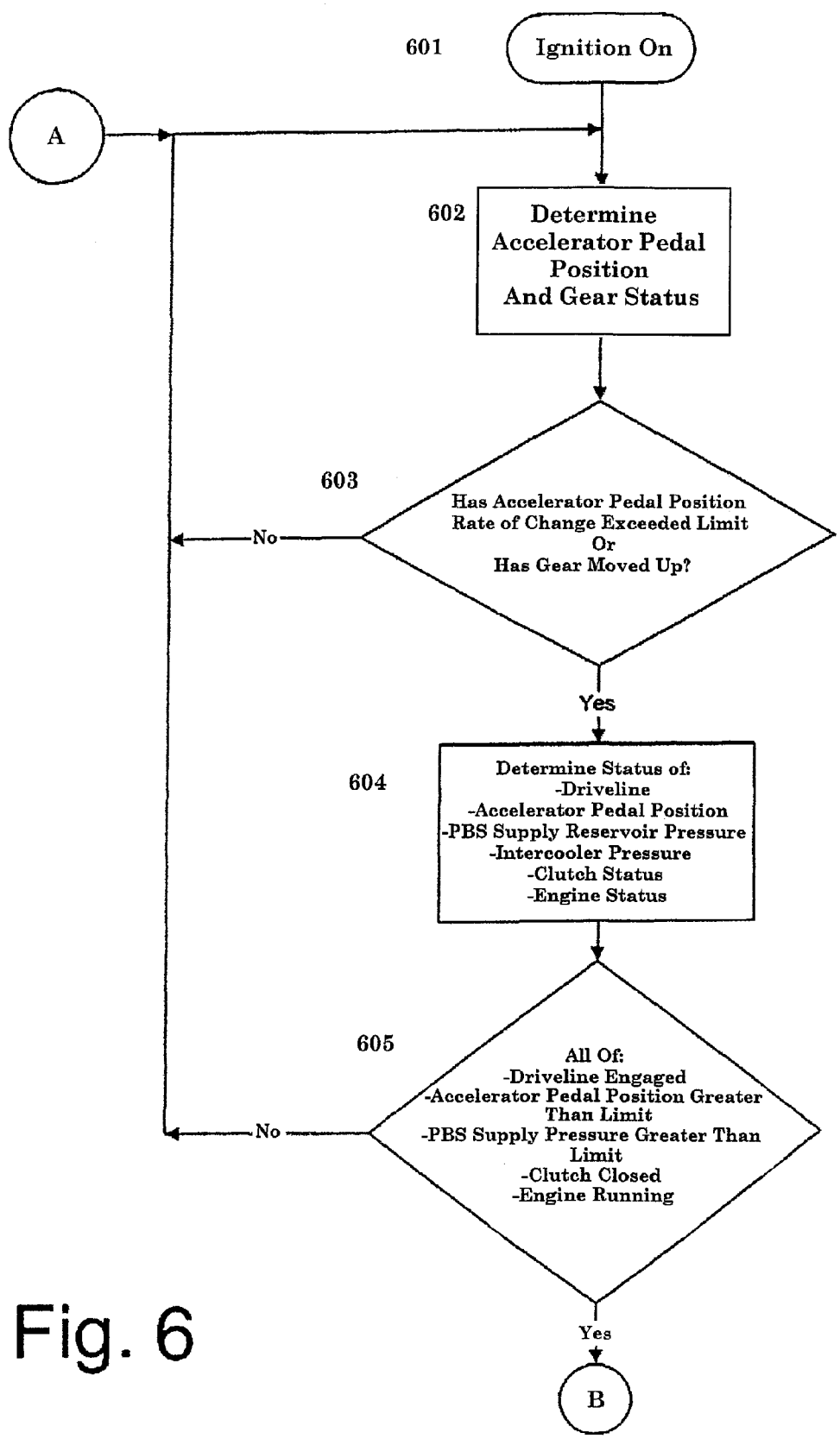
FIG. 6 is a flow chart illustrating a first portion of control decisions and dependencies for initiation and deactivation of a pneumatic boost event in accordance with an embodiment of the present invention.
Figure 7:
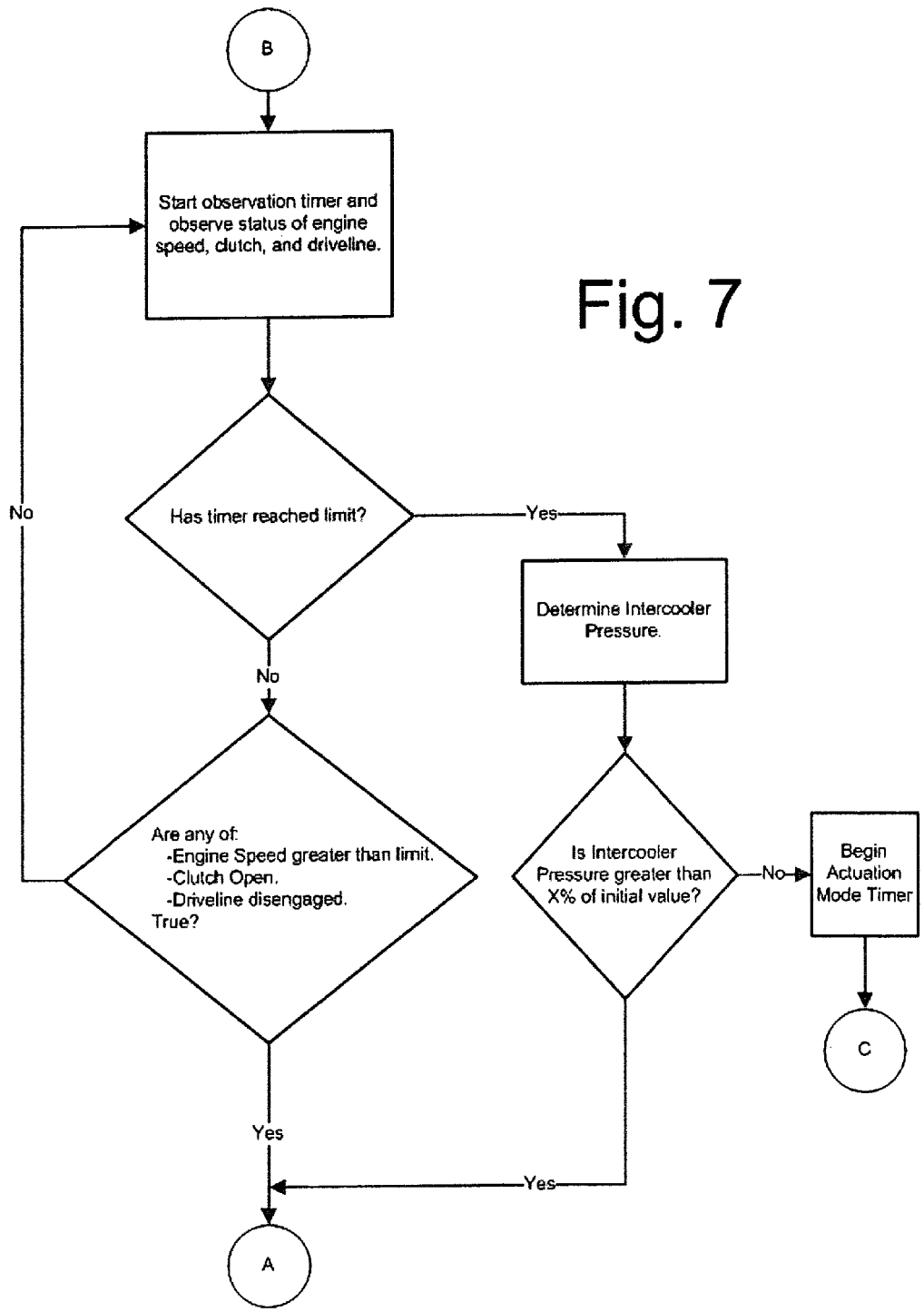
FIG. 7 is a flow chart illustrating a second portion of control decisions and dependencies for initiation and deactivation of a pneumatic boost event in accordance with an embodiment of the present invention.
Figure 8:
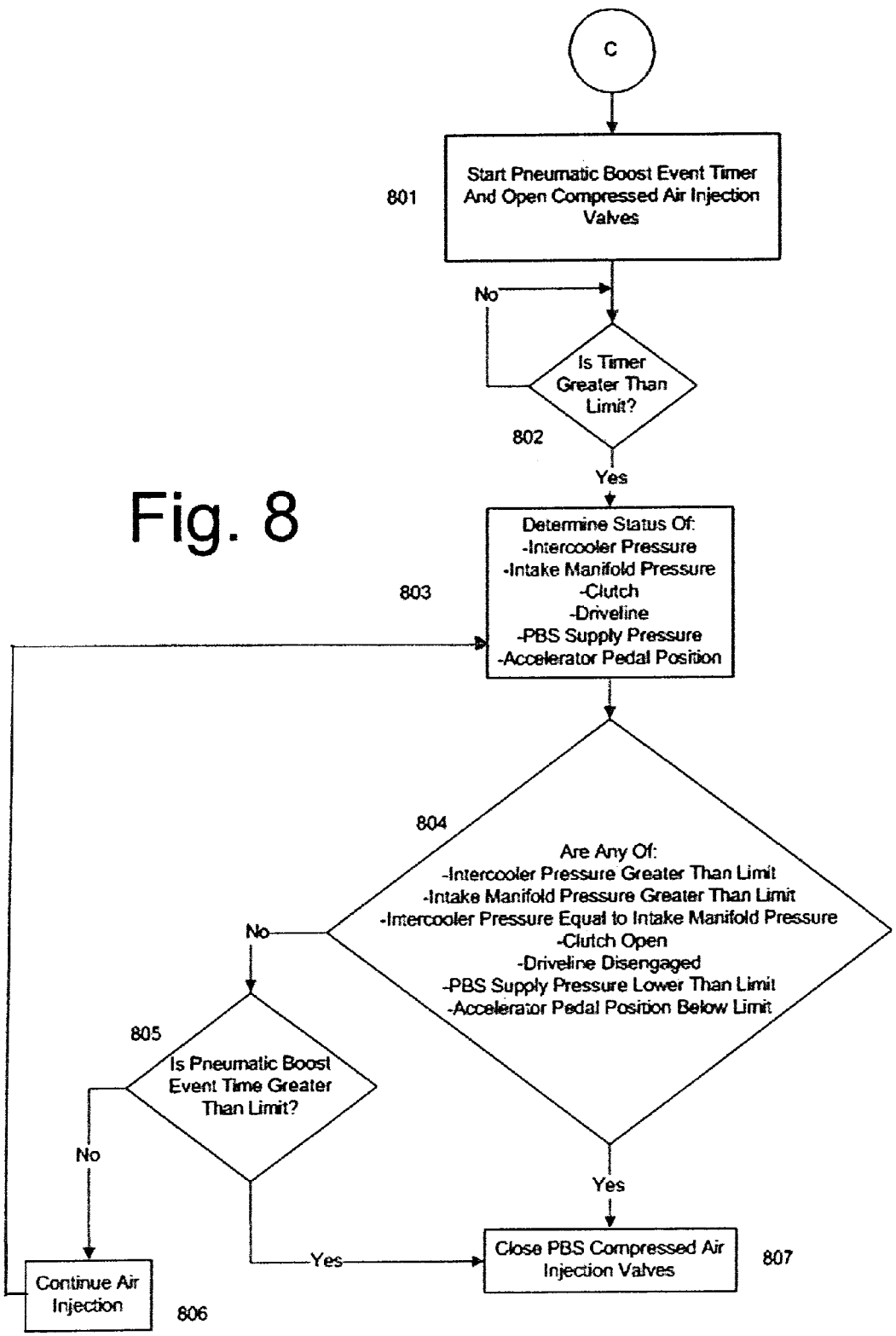
FIG. 8 is a flow chart illustrating a third portion of control decisions and dependencies for initiation and deactivation of a pneumatic boost event in accordance with an embodiment of the present invention.

Applying the control logic in the embodiment illustrated in FIGS. 6-8, the pneumatic booster system controller outputs control signals to activate or deactivate a pneumatic boost event via control of the solenoid valves 407, 408 in the air control device 308. In a first part of the control logic shown in FIG. 6, the control logic begins in step 601 with the pneumatic booster controller 318 being activated with the operator turning on the vehicle's ignition. The pneumatic booster controller 318 next determines in step 602 the position of the accelerator pedal and the current gear selection status. In step 603 the controller determines from the information obtained in step 602 whether the rate of change of the accelerator pedal position has exceeded a predetermined rate of change limit, or the gear has changed to a higher gear. If neither of these conditions have been met, the control logic returns to step 602. If, on the other hand, one of these conditions has been detected, the control logic moves to step 604.

In step 604, the controller determines from the inputs it receives, for example, from data transmitted over the vehicle's CAN bus system, the status of: the driveline, the accelerator pedal position, the pneumatic booster system compressed air supply reservoir, the pressure in the vehicle's intercooler, the status of the clutch, and the engine's rotating speed.

From the information gathered in step 604, in step 605 the control logic determines whether the conditions are appropriate for initiating actual compressed air injection. Specifically, the controller determines whether all of the following criteria are met: driveline engaged; accelerator pedal position greater than a predetermined position; pneumatic booster system compressed air supply reservoir pressure greater than a predetermined minimum pressure limit; clutch closed; and engine is running. In this embodiment, these are all "threshold" criteria which must be satisfied before a pneumatic boost event is initiated by pneumatic booster controller 318. If one of these conditions has not been met i.e., the condition is "FALSE"), the control logic returns to step 602. If, on the other hand, all of these conditions has been met (i.e., all criteria are evaluated "TRUE"), the control logic moves to portion B of the control logic, illustrated in FIG. 7.

At step 701 in FIG. 7, the pneumatic booster controller 318 starts an observation timer and observes, for example, by monitoring signals on the CAN bus network from the engine controller and transmission controller, the status of the driveline (e.g., engaged/disengaged), clutch (e.g., open/closed) and engine speed (e.g., rpm). In step 702 the pneumatic booster controller 318 checks whether the timer has reached a predetermined time limit. If the time limit has not been reached, the pneumatic booster controller 318 next determines in step 703 whether the state of "TRUE" exists for at least one of: engine speed greater than a predetermined limit; clutch open; and driveline disengaged. If none of these conditions have occurred, the control logic returns to step 701 for continued timer and status monitoring.

If, however, in step 702 the pneumatic booster controller 318 determines that the predetermined time limit has been reached, in the final test in this embodiment prior to initiating compressed air injection the controller 318 verifies that the pressure in the vehicle's intercooler is not too high (to ensure that the intercooler is not damaged by a compressed air injection in a pneumatic boost event). This is accomplished by determining in step 704 the pressure within vehicle's intercooler, and then in step 705 evaluating whether the intercooler pressure is greater than a predetermined percentage of its initial value (in step 705, "X"%). If the intercooler pressure is too high, the control logic restarts the pneumatic boost event evaluation process by returning control to the beginning of the control logic at portion A (i.e., to step 602). If instead, all of the pre-event conditions in the FIG. 7 control logic have been satisfied, the pneumatic booster controller 318 transfers control to the first step of the compressed air injection portion C of the control logic illustrated in FIG. 8.

Having determined that all of the pre-conditions for initiation of the pneumatic boost event have been met, at step 801 the pneumatic booster controller 318 starts a pneumatic boost event timer and commands the opening of one or both of the compressed air flow control solenoid valves in air control device 308 to initiate air injection. As described in greater detail below, the controller 318 commands the opening and closing of the air injection solenoid valves in a manner which effectively shapes the air injection to conform to an air injection curve which maintains compliance with emissions and/or other design criteria during the pneumatic boost event.

In step 802 the controller determines whether the boost event timer has reached a predetermined elapsed time. Once the time limit has been reached, the pneumatic booster controller 318 determines the status of: intercooler pressure, intake manifold pressure, clutch, driveline, pneumatic booster system compressed air supply pressure and accelerator pedal position. The controller 318 then evaluates the obtained status information to determine whether any of the following pneumatic boost event termination criteria are true: intercooler pressure greater than a predetermined limit; intake manifold pressure greater than a predetermined limit; intercooler pressure equal to intake manifold pressure; clutch open; driveline disengaged, pneumatic booster system compressed air supply pressure lower than a predetermined limit; and accelerator pedal position lower than a predetermined limit. If none of these event termination criteria have been exceeded, control is transferred to step 805, at which point the controller 318 determines whether the boost event timer has reached a predetermined time limit. If the time limit has not been reached, the current compressed air injection profile is continued (step 806), with control being transferred back to step 803. If either time limit has been reached, or one of the termination criteria in step 804 has been met, the pneumatic booster controller 318 moves to step 807 and commands the compressed air injection solenoid valves to be deactivated, terminating the pneumatic boost event. Control is thereafter transferred back to the beginning of the control logic at portion A in FIG. 6.

One of skill in the art will recognize that the foregoing list of termination criteria is not exhaustive, and that other criteria also may be utilized, such as detection of an emissions constituent at or near a regulatory limit, or an component such as an exhaust gas treatment device (e.g., a catalytic converter) reaching a temperature limit. Further, the compressed air injection in portion C of the control logic may include either a constant compressed air injection, or may follow a rate-shaped compressed air injection curve using either continuous or pulsed operation of the solenoid valves 407, 408, as discussed further below.

Pneumatic Boost Event Rate Shaping.

In the present embodiment, the compressed air injection during a pneumatic boost event is performed using two solenoid-controlled air injection valves, as shown in FIG. 4 (valves 407, 408). These valves are deliberately sized to flow compressed air at different flow rates, and are extremely fast-acting. These valves thus provide the pneumatic booster system controller 318 with the ability to control the rate of compressed air injection by varying the total air flow rate by operating air injection valves 407 and 408 separately or together, and/or by operating valves 407 and 408 in a pulsed manner with varying compressed air injection pulse duration and/or pulse initiation timing.

Figure 9:
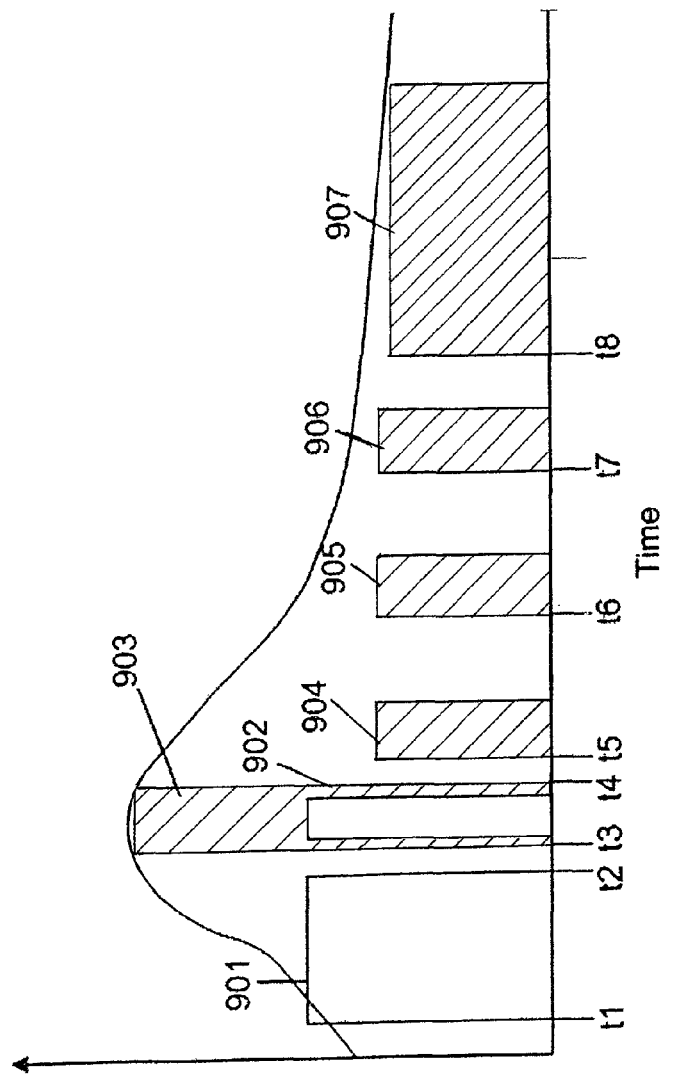
FIG. 9 is a graph of a rate-shaped compressed air injection event in accordance with an embodiment of the present invention.

FIG. 9 illustrates an example rate-shaped compressed air injection profile in a pneumatic boost event in accordance with an embodiment of the present invention. In this boost event, the rate of air injection is "shaped" over time to achieve a desired result air injection profile by varying the air injection source (valve 407 an/or valve 408) and the duration and timing of the air injection.

Based on the sensor and other controller inputs the pneumatic booster controller 318 has received, either directly or over the vehicle CAN bus, and further based on "learned" vehicle response profiles stored from previous pneumatic boost events if available, the pneumatic booster controller 318 initiates a pneumatic boost event according to a predetermined compressed air injection plan which shapes the air and timing of air injection in a manner designed to meet one or more desired objectives, such as emissions compliance and maintenance of passenger comfort. In this example embodiment, at time t1 a first compressed air injection 901 is made from the compressed air injection valve having the larger air flow rate (in this embodiment, valve 407). The injection from valve 407 is terminated by the pneumatic booster controller 318 at time t2, having provided a sufficient initial injection of compressed air to increase engine torque output and increase exhaust gas flow, but not so much air volume that, for example, the potential for exceeding an emission limit is increased.

Following the initial pulse of compressed air injection, after a short delay corresponding to approximately the time required for exhaust gas generated by the initial compressed air injection to reach the exhaust manifold and act on the turbocharger and/or for sufficient EGR flow to reach the intake, the pneumatic booster controller 318 at time t3 commands both valves 407 and 408 to be opened together to provide a further compressed air injection at a higher flow rate (combined injection 902 from the larger flow rate valve 407 and injection 408 from the smaller flow rate valve 408). The timing of the termination of this joint compressed air injection at time t4 is determined by the pneumatic booster controller 318, based on, for example, the predetermined rate-shaped injection profile, a refined rate-shaped injection profile (e.g., a revised injection profile based on vehicle parameter responses to the initial compressed air injection pulse), and/or a termination criteria identified in FIG. 8. Further compressed air injections 905, 906, 907 are provided at times t5, t6, t7, t8 using the smaller flow rate valve 408 as necessary to maintain a desired engine torque output without, to the maximum extent practical, exceeding applicable design and regulatory limits. In addition to the short, small volume air injections 905 and 906, once the vehicle operating parameters have stabilized after the initial compressed air injections it may be possible to follow up with a longer low flow rate injection 907, which produces fewer undesired sharp "on/off" vehicle reaction transients in response to the compressed air addition and cut-off events.

As shown in FIG. 9, rather than the prior art's immediate, full compressed air injection, the rate of compressed air injection in the present example follows a curve (approximated by the variable-width injection pulses) which starts at an intermediate rate (injection 901), rises to a higher rate shortly thereafter (injections 902, 903) and decreases to lower rate, lower volume level (injections 904-907) towards the end of the pneumatic boost event. The practical effect of this rate-shaping approach to compressed air injection is illustrated in FIG. 10.

Figure 10:
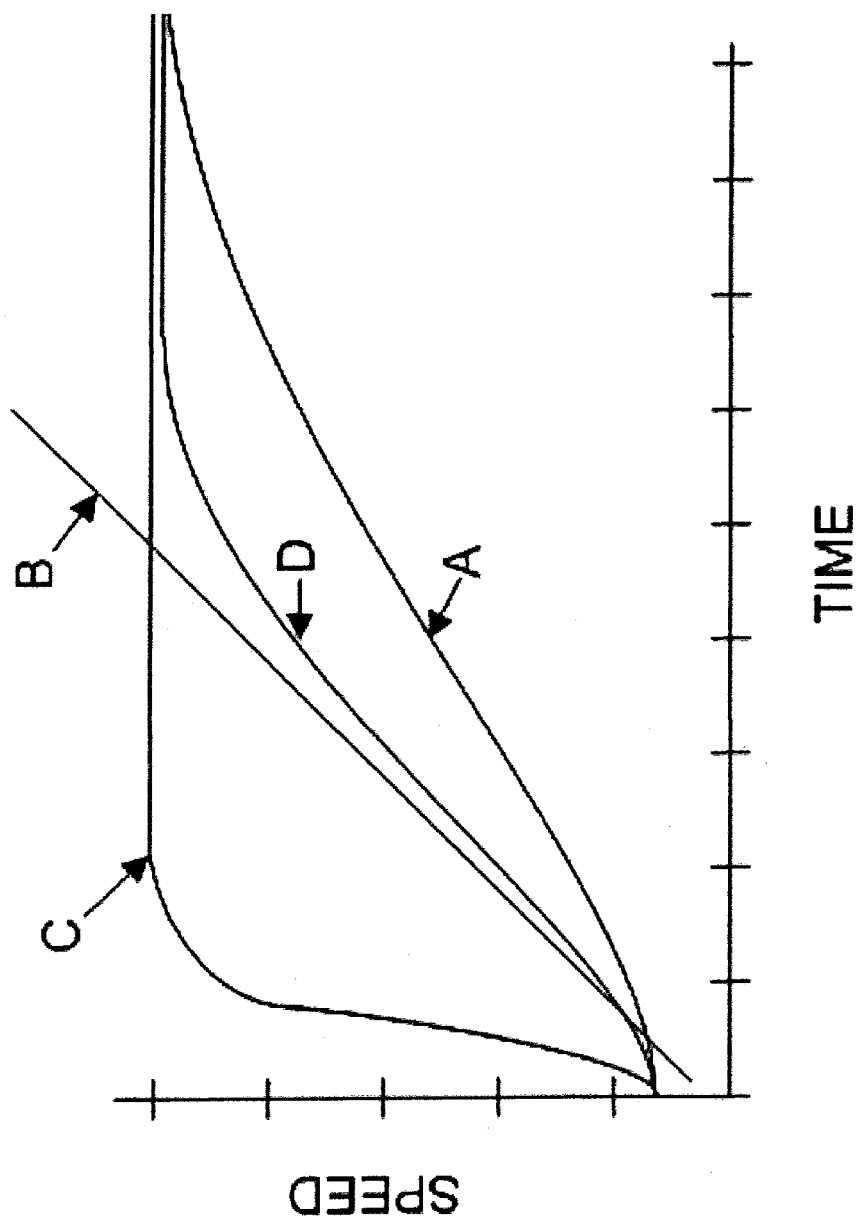
FIG. 10 is a graph illustrating a vehicle's response to a pneumatic boost event in accordance with the present invention as compared to the vehicle response to the prior art.

FIG. 10 compares the reaction of vehicle speed vs. time in the event of an acceleration demand between the cases of no pneumatic boost event, a pneumatic boost event with a prior art pneumatic booster system's "as much as possible, as soon as possible" compressed air injection, and a pneumatic boost event performed with a pneumatic booster system in accordance with the present invention. Curve A illustrates the rate at which a vehicle which is not equipped with a pneumatic booster system could be expected to gain speed over time. As is evident from the figure, the non-PBS assisted vehicle's acceleration rate (the slope of velocity vs. time of curve A) is well below the maximum acceleration rate for maintaining passenger comfort in the vehicle, the slope of maximum passenger comfort curve B.

In contrast to the non-pneumatic booster-equipped vehicle, a previous pneumatic booster system-equipped vehicle, with its "as much as possible, as soon as possible" approach to injecting compressed air during a pneumatic boost event, accelerates at a high rate, represented in FIG. 10 by curve C. While such a prior art-equipped vehicle gains speed in a very short time, it does so at an acceleration rate which far exceeds an acceptable level of passenger comfort.

Curve D illustrates the effect of the present invention's approach to pneumatic boosting. By providing a variable rate and volume of compressed air injection shaped to ensure the vehicle does not exceed an acceleration which is beyond the maximum passenger comfort level, the continuously adjusted air injection maintains the engine torque output at levels which permit the vehicle increase speed relatively quickly, while still maintaining passenger comfort. The initial compressed air injection profile (i.e., the pattern of the opening and closing air injection valves 407, 408, including selection of which valves to open, the duration of the valve(s) opening and the timing of the opening of the valves) may be obtained from, for example, injection profiles stored in a memory of the vehicle, such as in a memory of the pneumatic booster controller, or may be set immediately prior to the initiation of a pneumatic boost event based on one or more parameters of the vehicle, such as remaining available compressed air supply, vehicle load, intake manifold pressure, etc. This initial compressed air injection profile may be adjusted as quickly as after the first air injection pulse in a multi-pulse pneumatic boost event, before a second air injection pulse is commanded by the pneumatic booster controller.

Figure 11:
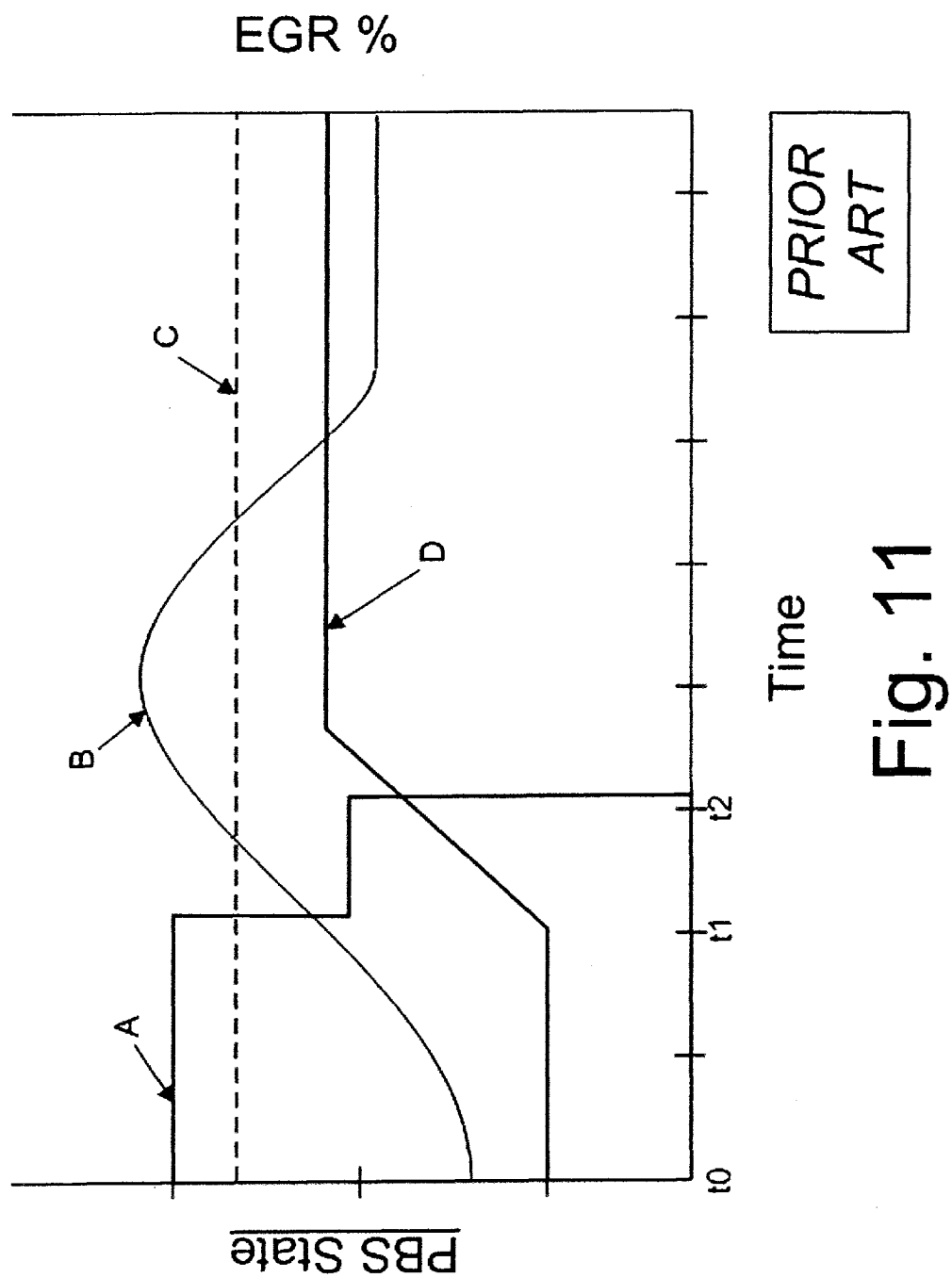
FIG. 11 is a graph illustrating NOx emissions response to a pneumatic boost event with a prior art PBS system.
Figure 12:
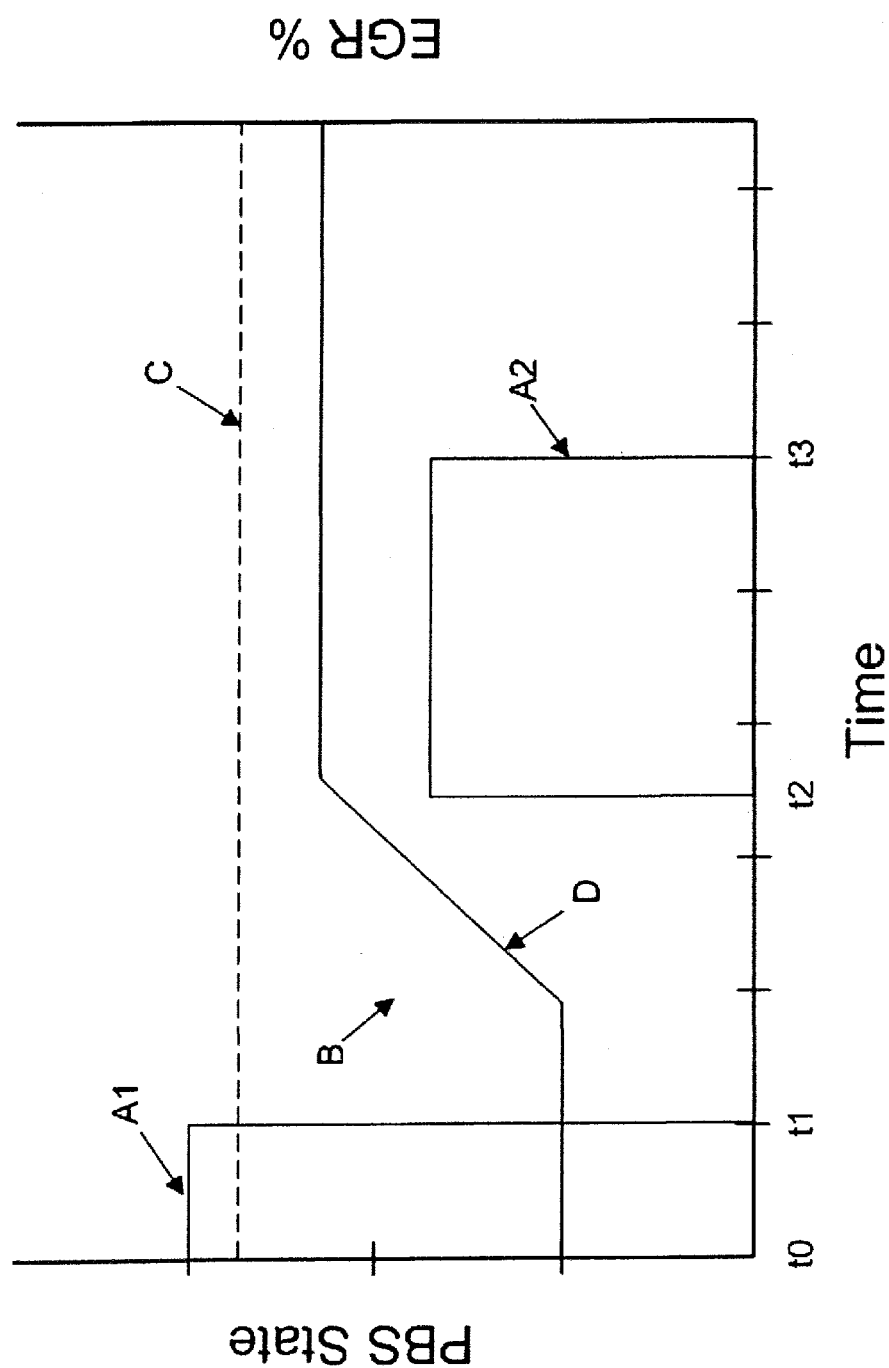
FIG. 12 is a graph illustrating NOx emissions response to a pneumatic boost event in accordance an embodiment of the present invention.

FIGS. 11 and 12 illustrate the benefits obtainable in an embodiment of the present invention which uses rate shaping to minimize the potential for NOx emission levels to exceed regulatory limits, as compared with a previous pneumatic booster system. FIG. 11 shows a graph of the transient NOx emissions response as a function of the amount and timing of compressed air injection during a pneumatic boost event. The axis on the left of FIG. 11 represents the status of compressed air injection. The axis on the right of this figure represents the EGR rate, a measure of the amount of exhaust gas available to inject into the engine's intake to suppress NOx formation in the engine's combustion chambers. In this prior art system, the compressed air injection is performed with two injection flow paths, with the greatest available compressed air flow starting at the beginning of the pneumatic boost event and being maintained for nearly the entire duration of the event (curve A, from time t0 to t1). Near the end of this "maximum effort" compressed air injection, the lower flow air injection path is closed at time t1, and shortly thereafter at time t2 the remaining air injection path is closed.

As a consequence of the large, immediate compressed air injection, there is a large amount of oxygen introduced into the engine which is not matched by a corresponding increase in recirculated exhaust for NOx formation suppression, i.e., there is a lag between the increased air injection and the creation of additional exhaust gas to create additional pressure to push additional exhaust gas through the EGR system to reach the engine's intake. As a result, combustion temperature-reducing recirculated exhaust gas is not immediately available in sufficient quantity to adequately suppress combustion temperatures and associated NOx creation. In the absence of sufficient recirculated exhaust gas, the amount of NOx generated in the higher-temperature combustion chamber environment rises rapidly, as illustrated by curve B. The rapid rise in NOx generation can cause the NOx level to easily exceed the regulatory limit, curve C, particularly the substantially lower NOx limits which are becoming applicable to new vehicles in Europe and elsewhere.

Eventually, as exhaust gas pressure builds the amount of exhaust gas available for recirculation increases, and the EGR ratio rises (illustrated by curve D) and NOx formation is again suppressed in the combustion chambers. However, due to the delay in exhaust gas recirculation inherent in the prior art's full immediate compressed air injection, such a prior art system cannot preclude NOx limit excursions.

FIG. 12 illustrates the response of NOx levels with a rate-shaped compressed air injection in accordance with an embodiment of the present invention. In this embodiment, instead of the prior art's "maximum effort" compressed air injection, the compressed air injection is conducted in two steps, effectively extending and lowering the shape of the air injection curve to control NOx formation. A first, short compressed air injection pulse A1 is made between times t0 and t1, using, in this embodiment, both compressed air injection valves 407, 408 in air control device 308 (alternatively, only a single valve make be opened if the desired amount of flow will be achieved). Because the initial compressed air injection pulse is short, the excess oxygen state is not maintained in the engine's combustion chambers for a period long enough to cause the combustion temperatures to rise high enough to generate excessive NOx emissions. Accordingly, as shown by curve B, while the amount of NOx increases in response to the additional oxygen injection, the increase is small enough to maintain NOx levels below the NOx emissions limit (curve C) until additional EGR flow becomes available.

The desired additional EGR flow propagates through the exhaust manifold and the EGR system shortly after the initial compressed air injection pulse A1 is delivered to the engine. As shown by the EGR ratio curve D in FIG. 10, at approximately the same time D the additional EGR flow also reaches the intake, and an additional compressed air injection A2 is initiated at time t2 to provide the desired increase in engine torque output. The rate-shaped compressed air injection profile thus maintains NOx levels below the curve C NOx regulatory limit in this example.

In this embodiment, a reduced compressed air flow rate is generated by opening only one of the two compressed air injection valves 407, 408. The reduced compressed air flow from only one compressed air circuit helps the pneumatic booster controller 318 more accurately match the compressed air injection rate with the amount of EGR flow available to suppress NOx formation, and minimizes compressed air usage by avoiding over-injection. Because the present invention's approach to shaping the rate of the compressed air injection allows the EGR flow to increase to acceptable levels before further compressed air injections are made, the NOx levels are maintained at a relatively constant level from about time t2 though the rest of the pneumatic boost event, as shown by curve B.

The present invention's approach to compressed air injection management also provides vehicle performance and efficiency benefits with improved transmission gear shifting strategies.

It is well known in the art that during and immediately after an upshift of a vehicle transmission the engine speed drops to a lower rpm (due to the change in gear ratio). At lower engine speeds, less exhaust gas is generated and therefore less exhaust gas flow is available to drive the turbocharger turbine and maintain the turbocharger compressor speed Accordingly, the turbocharger is unable to maintain the pre-shift level of intake pressure and the engine torque output falls. This is illustrated, for example, in FIG. 14.

Figure 14:
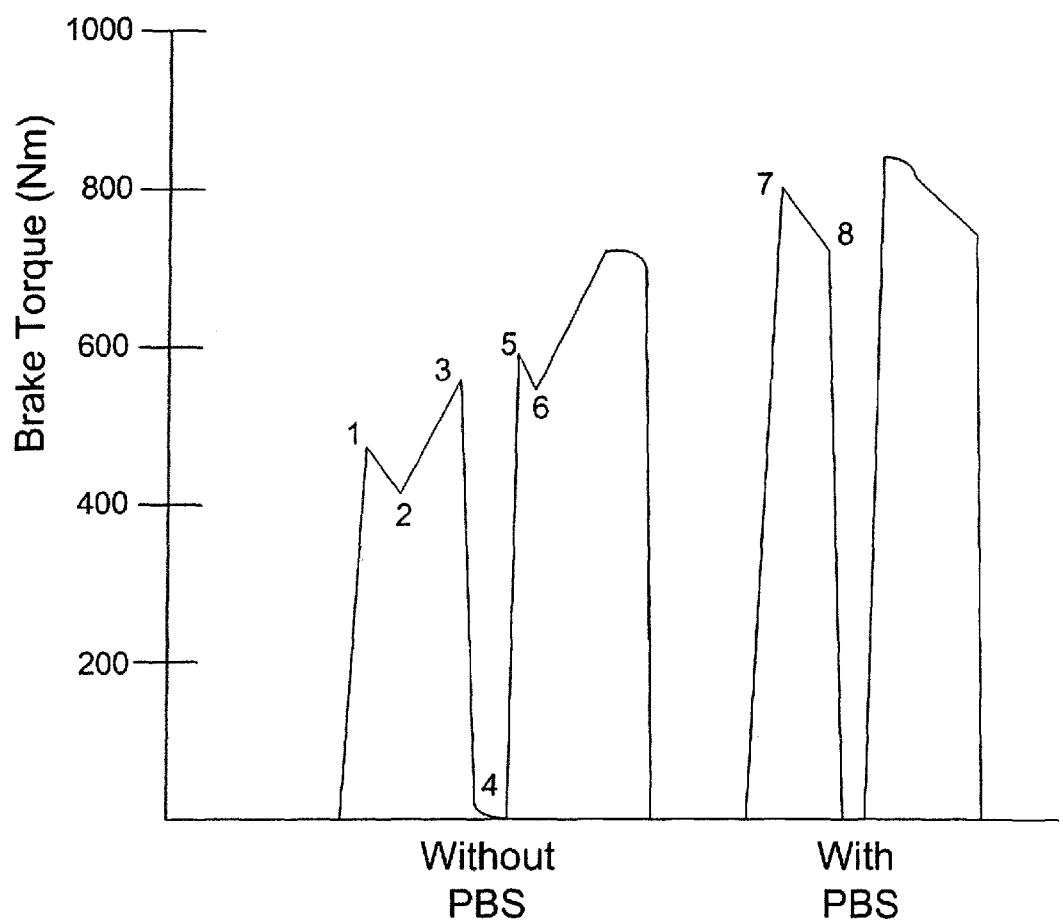
FIG. 14 is a graph of engine torque output of prior art engines during upshift events.

FIG. 14 is a graph of engine torque output (in Newton-meters) as a function of time during gear upshifts. The two torque output columns on the left side of the graph are upshifts in a prior art vehicle which is not equipped with a pneumatic booster system, while the two columns on the right side of the graph are upshifts in a vehicle equipped a prior art pneumatic booster system. In the non-boosted vehicle, the engine torque output at point 1 is the engine output as the clutch re-engages the engine to the drivetrain following a previous upshift. Because the engine is now not producing as much exhaust gas flow at the lower engine speed resulting from the upshift, the intake pressure generated by the turbocharger falls, resulting in the drop in engine torque output between point 1 and point 2. Point 2 represents the point at which the engine speed and exhaust gas flow have increased sufficiently to cause the turbocharger compressor speed to recover enough to stop the engine torque output fall and begin to increase torque output. The engine speed then continues to increase, further increasing turbocharger speed and intake pressure up to the point at which an upshift is required to avoid over-speeding of the engine.

During the next gear changing operation, for a short period the clutch is disengaged and engine fueling is restricted such that the engine torque output effectively drops to zero (point 4). Once the next higher gear is selected, the engine torque output is raised to point 5 as the clutch again re-engages. The effects of falling engine torque output due to lower engine speed and consequent lower intake pressure is repeated as the torque output falls to point 6, followed by increasing torque output as the turbocharger speed recovers.

In a vehicle equipped with a prior art pneumatic booster system, the drop in engine torque output due to an upshift may be somewhat ameliorated by compressed air injection in conjunction with an upshift. Referring again to FIG. 14, point 7 identifies the engine torque output generated in a pneumatic booster system-equipped vehicle immediately upon completion of an upshift. By immediately applying pneumatic boost, the engine's torque output is immediately higher than in the case of a non-PBS-equipped vehicle (in this example, nearly double the torque output as compared to that at point 1). The prior art's immediate, full strength compressed air injection ensures that during the upshift, there remains sufficient air pressure in the intake manifold to maintain torque output and exhaust gas flow. Accordingly, there is little reduction in the turbocharger turbine speed during the prior art pneumatic booster system's boost event, and only a limited decrease in engine torque output as the turbocharger output takes over engine boosting up to the point of the next upshift operation at point 8.

Figure 15:
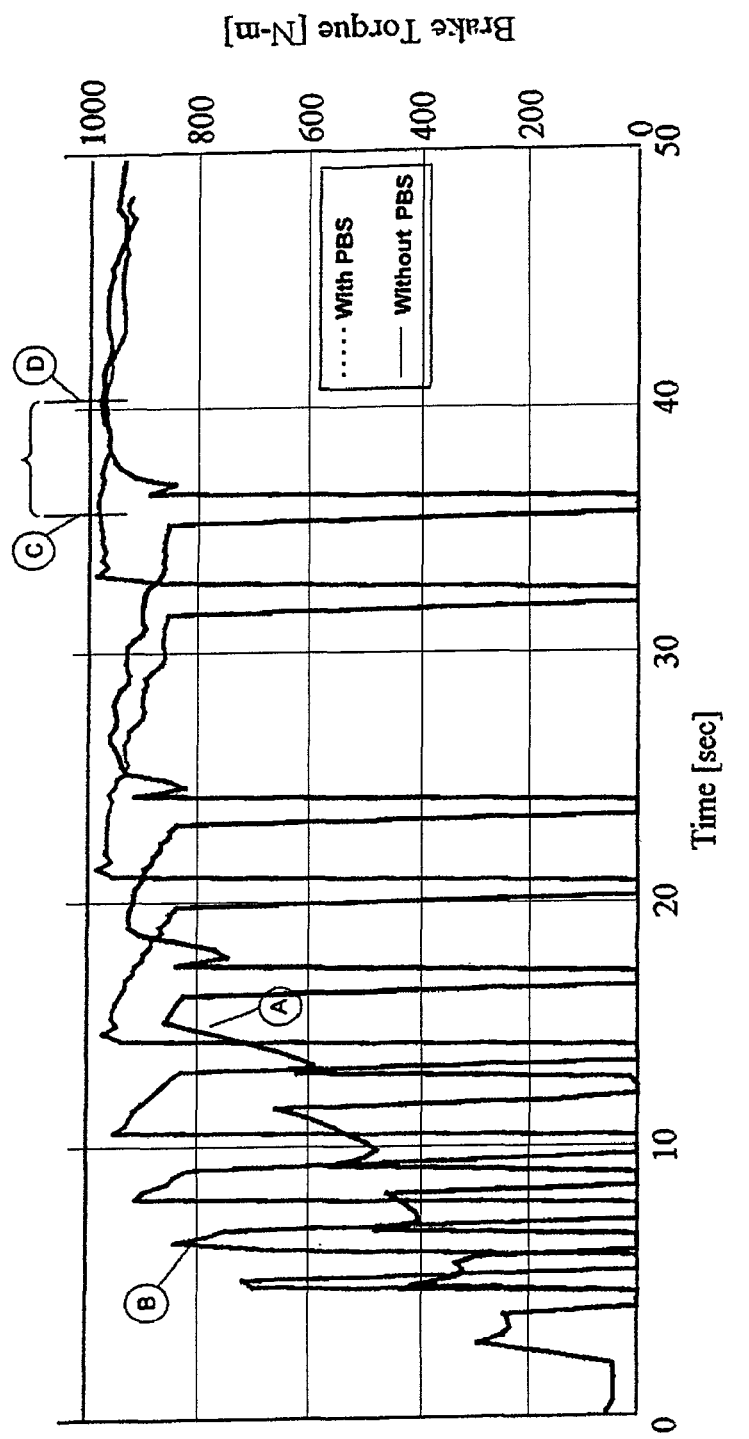
FIG. 15 is a graph of time-to-speed performance comparing performance of vehicles equipped with prior art engines with and without pneumatic booster systems.

Surprisingly, even with the substantially higher engine torque output generated by a prior art pneumatic booster system as compared to a vehicle not equipped with such a system, the total time required to proceed through several upshifts to reach a desired cruising speeds in not significantly reduced. FIG. 15 illustrates the time to speed performance of non-PBS- and previous PBS-equipped-vehicles. In this figure, two curves illustrate typical engine torque output over time from (i) an engine which is not provided with a pneumatic booster system (curve A, the lower of the two curves), and (ii) from an engine equipped with a prior art pneumatic booster system (curve B, the higher of the two curves). Over the course of shifting to top gear (in this example, tenth gear), despite the availability of additional engine torque output with the PBS-equipped engine, the relatively shorter periods in which this engine torque is applied in each gear in the previous PBS-equipped vehicle, as a practical matter, results in the vehicle reaching its cruising speed in top gear (identified by the corresponding cruising torque output at point C) only five seconds before the non-PBS-equipped vehicle reaches cruising speed (point D).

In contrast to the prior art, the present invention provides a pneumatic boost injection strategy which enables significantly greater time-to-speed performance than that provided by prior art pneumatic booster systems. In this approach, the pneumatic booster controller and the transmission controller may communicate with one another to determine whether conditions are sufficient to provide compressed air injection during a response to an operator acceleration demand. If the conditions are satisfied, a pneumatic boost event in which the compressed air injection rate curve is rate-shaped to maintain compliance with design and regulatory constraints may be initiated in conjunction with the implementation of an alternative gear shifting profile.

As shown in FIGS. 16a-16b, the transmission controller may be either a source of a pneumatic boost event request (FIG. 16a), or the transmission may respond to a pneumatic boost event initiated elsewhere in the vehicle, such as by the pneumatic booster controller (FIG. 16b). FIG. 16a illustrates a situation in which the transmission controller receives an operator's demand for acceleration, or alternatively, for example, based on GPS position signals and current routing, the vehicle electronics generate an anticipatory torque output demand to maintain vehicle speed in view of upcoming road conditions (such as an approaching steep road grade). In response to the increased torque demand, the transmission controller may communicate a request for initiation of a pneumatic boost event to the pneumatic booster controller. The request to the pneumatic booster controller may further include current gear selection and other vehicle parameters to facilitate the boost controller's issuance of rate-shaped compressed air injection to provide as much pneumatic boost as possible within applicable design and/or regulatory limits.

FIG. 16b illustrates a situation in which the transmission controller is instead provided information regarding a pneumatic boost event initiated by the pneumatic booster controller, and is also provided with information regarding the current capabilities of the pneumatic booster system (for example, information on system faults which may limit the amount of torque output the transmission controller can expect to be delivered by the engine during the pneumatic boost event), as well as other vehicle status information such as whether the vehicle is stationary or moving, vehicle speed, etc. Based on the information the transmission controller receives, the controller may then select from a variety of alternative gear shifting profiles the shifting profile that will result in a desired performance, such as shorted time to speed, highest fuel economy, or lowest transmission stress levels.

Figure 17:
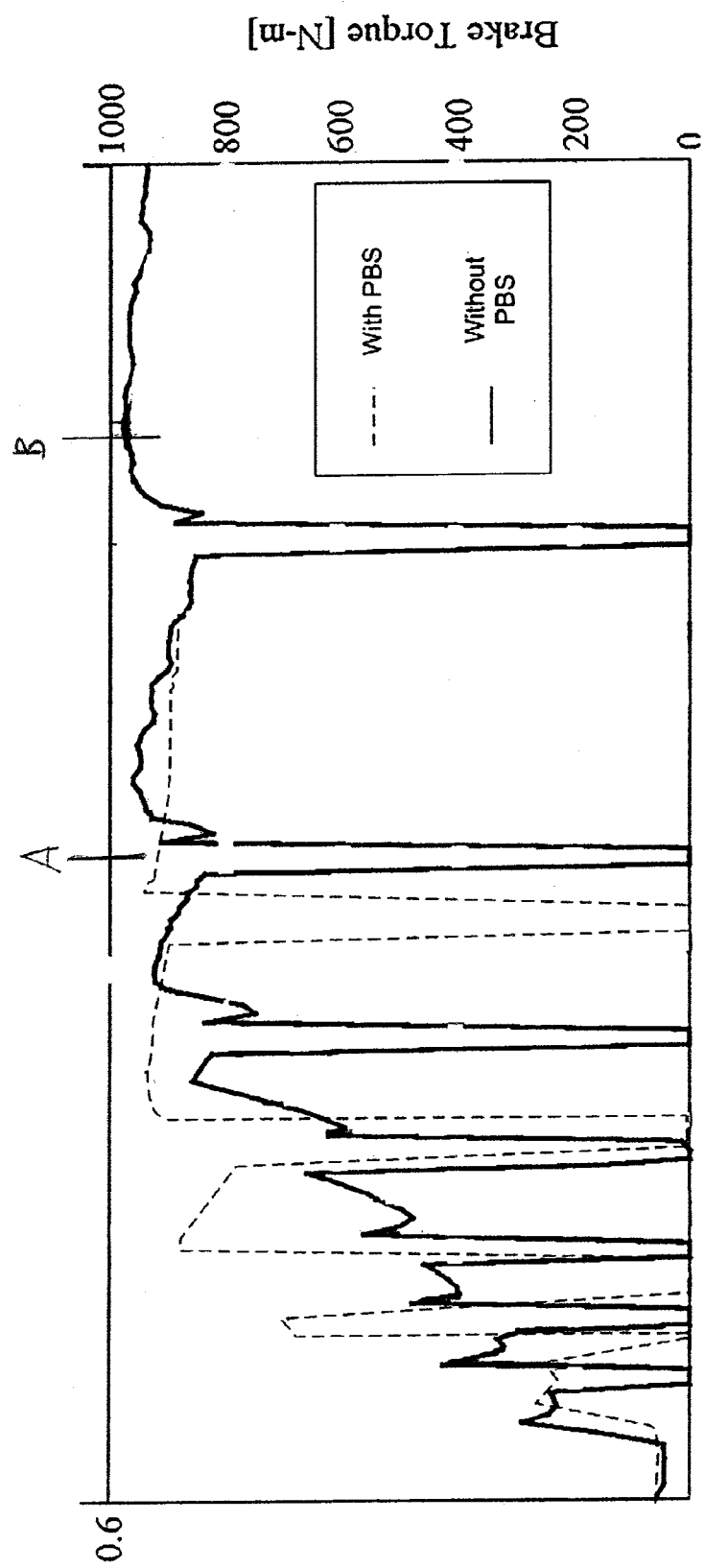
FIG. 17 is a graph of time to speed performance illustrating performance of vehicles equipped with a prior art engine without a pneumatic booster system and an engine equipped with a rate-shaping pneumatic booster system in accordance with an embodiment of the present invention.

An example of a preferred transmission shift strategy is illustrated in FIG. 17. In this embodiment, rather than applying pneumatic boost while the transmission is upshifted through every forward gear (as typical in the prior art), the compressed air injection may be commanded by the pneumatic booster controller in a rate-shaped manner to permit certain of the gear ratios to be "skipped" during the acceleration to the desired cruising speed. In the example shown in FIG. 17, the pneumatic booster controller tailors the rate and timing of the compressed air injection to permit the use of higher gear ratios than usual, earlier than usual, such that in this example only gears 3, 4, 7, 8 and 10 are engaged during the acceleration.

In a shifting scenario in which gear ratios are omitted, there will be a larger than usual decrease in engine speed as the gear ratios change, and consequent larger than usual drop in engine torque output. In a prior art pneumatic booster system, the known air injection approach of "as much possible, as soon as possible" would, at a minimum, create a severe emissions excursion during a compressed air injection due to the very low EGR flow at the much lower than usual rpm experienced from the omission of one or more gears from the shift pattern. The prior art's application of a very large compressed air injection at very low engine speed may also possibly damage the vehicle drive train from excessive low speed torque output, or create such a large, sudden exhaust gas flow from the engine that a turbocharger overspeed event occurs. Because of this substantial risk of vehicle damage and/or failure to meet emissions requirements, the prior art's approach to pneumatic boosting is viewed in the art as unsuitable for supporting the skipping gear shifts during vehicle acceleration.

In contrast, the rate-shaping capability of the present invention allows the compressed air injection rate, duration and timing to be tailored to the unusually large rpm drop associated with skipping gears, while still providing as much engine torque output as possible within design and regulatory limits. Specifically, as the gear shifts occur, the pneumatic booster controller may control the amount of compressed air injection to a level well below the prior art's "all now" injection approach while simultaneously monitoring vehicle parameters to determine whether, when and by how much the compressed air injection may be increased as engine speed increases.

An example of the results of the application of the rate-shaping of the present invention to obtain significantly improved vehicle acceleration performance is shown in FIG. 17. As compared with the prior art's time-to-speed performance in the example shown in FIG. 15 (approximately 39 seconds to speed with a non-PBS vehicle, also shown in FIG. 17 as point B), in this example the use of rate-shaped compressed air injection and a transmission shift profile using only gears 3, 4, 7, 8 and 10 results in reaching cruising speed in approximately 21 seconds (point A), or nearly ½ the time of a non-PBS-equipped vehicle. Further, this greatly enhanced time-to-speed surprisingly improves on the performance of a prior art PBS system constrained to a sequential gear shifting profile, with the rate-shaped, skip-shifted vehicle time to speed taking only approximately 60% of the time needed by a previous pneumatic booster system-equipped vehicle (fully 15 seconds quicker, 21 seconds as compared to 36 seconds for the prior art system). Alternatively stated, the present invention's use of rate-shaping of compressed air injection in a pneumatic boost event permits a transmission to use an alternative shifting profile that enables vehicle time-to-speed performance improvements of nearly 40% over prior art pneumatic booster systems, while still maintaining compliance with applicable design and regulatory limits.

In addition to the use of alternative transmission shifting profiles to obtain improved vehicle acceleration performance, the use of rate-shaped compressed air injection also enables the use of gear-skipping shifting profiles to improve fuel economy. Those of ordinary skill in the art will recognize that when an internal combustion engine, particularly a diesel engine, is operated in an engine speed range away from its optimum fuel efficiency range (i.e., away from the engine's "sweet spot"), the engine inherently uses more fuel. With the present invention's use of rate shaping to permit earlier shifting into higher gears, the vehicle is permitted to reach higher gears (and thus place the engine in its optimum fuel efficiency range) sooner than is possible with a prior art pneumatic booster system which cannot support non-sequential gear shifting.

The use of rate shaping also has the potential to allow application of rate-shaped pneumatic boost when the vehicle is in a higher gear (and thus at low engine speed) in operating conditions in which a prior art pneumatic booster system could not perform its "as much as possible, as soon as possible" injection without exceeding applicable limits. For example, where a prior art PBS system might require the transmission to be downshifted before a pneumatic boost event is initiated, the present invention's rate-shaped compressed air injection permits the vehicle to remain in a more fuel efficient higher gear, and eliminate an undesired shift which may cause passenger discomfort.

Rate shaping of compressed air injection further provides the ability to improve passenger comfort and fuel economy immediately following an upshift. For example, when a transmission controller becomes aware that an upshift is warranted, it may transmit a request for a pneumatic boost event to the pneumatic booster controller specifically for the purpose of using pneumatic boosting to compensate for the torque drop observed with the drop in engine rpm accompanying an upshift to a higher gear ratio. The pneumatic booster controller may then initiate a rate-shaped compressed air injection profile that provides a sufficient amount of air (and by notification to the engine's fuel injection controller, a corresponding amount of fuel to match the additional air injection) to compensate for torque drop immediately after the upshift, limited only by the need to avoid exceeding regulatory and/or design limits. As this upshift-compensating pneumatic boost event proceeds and engine speed climbs backup to previous levels, the compressed air injection may be adjusted to gradually decrease as the engine speed rises enough for the engine to again produce sufficient torque on its own. This rate-shaped upshifting torque compensation shifts allows the present invention to provide smoother power delivery by providing an essentially seamless supply of engine torque output from the engine, substantially limiting a passenger-perceivable "jolt" cause by sudden loss of acceleration when the torque output drops after an upshift. This post-upshift rate-shaped torque compensation approach also provides quicker time to speed, even if the amount of pneumatic boost is limited to some extent by a design or regulatory limit, as compared to a vehicle not equipped with a pneumatic booster system, and further enables better fuel economy due to the engine speed being returned sooner to its optimum power-producing rpm range.

Additional fuel savings and other benefits also may be realized with the present invention's rate-shaping by minimizing compressed air usage. As discussed above, in prior art pneumatic booster systems the maximum amount of compressed air is injected as quickly as possible into the engine's intake manifold to maximize the amount of engine torque output. This approach is highly wasteful of compressed air, requiring large volumes of compressed air be generated and stored on the vehicle. By focusing the compressed air injection to utilize only the precise amount of compressed air needed to obtain the maximum torque output achievable while operating right at or near operating limits, the present invention's rate-shaped air injections limit compressed air usage to the minimum possible level. This conservation of compressed air has a number of benefits, including: minimizing compressed air storage reservoir depletion (minimizing compressed air withdrawal from the compressed air reservoir effectively creates additional capacity margin prior to reaching a minimum storage reservoir pressure levels necessary to ensure critical systems (such as brakes) have a sufficient reserve of compressed air; reducing the engine-driven air compressor's duty cycle); reducing wear and increasing fuel economy by reducing parasitic power loss required to drive an air compressor which previously needed to be larger to service previous pneumatic booster system compressed air demands; and permitting the vehicle designer to downsize the compressed air generation and storage equipment, reducing vehicle weight and component costs and easing vehicle equipment packaging concerns. Moreover, decreasing the amount of compressed air injections also directly saves fuel by eliminating the need for the engine controller to provide increased fuel injection quantities during compressed air injections to ensure the appropriate fuel mixture is maintained.

Figure 13:
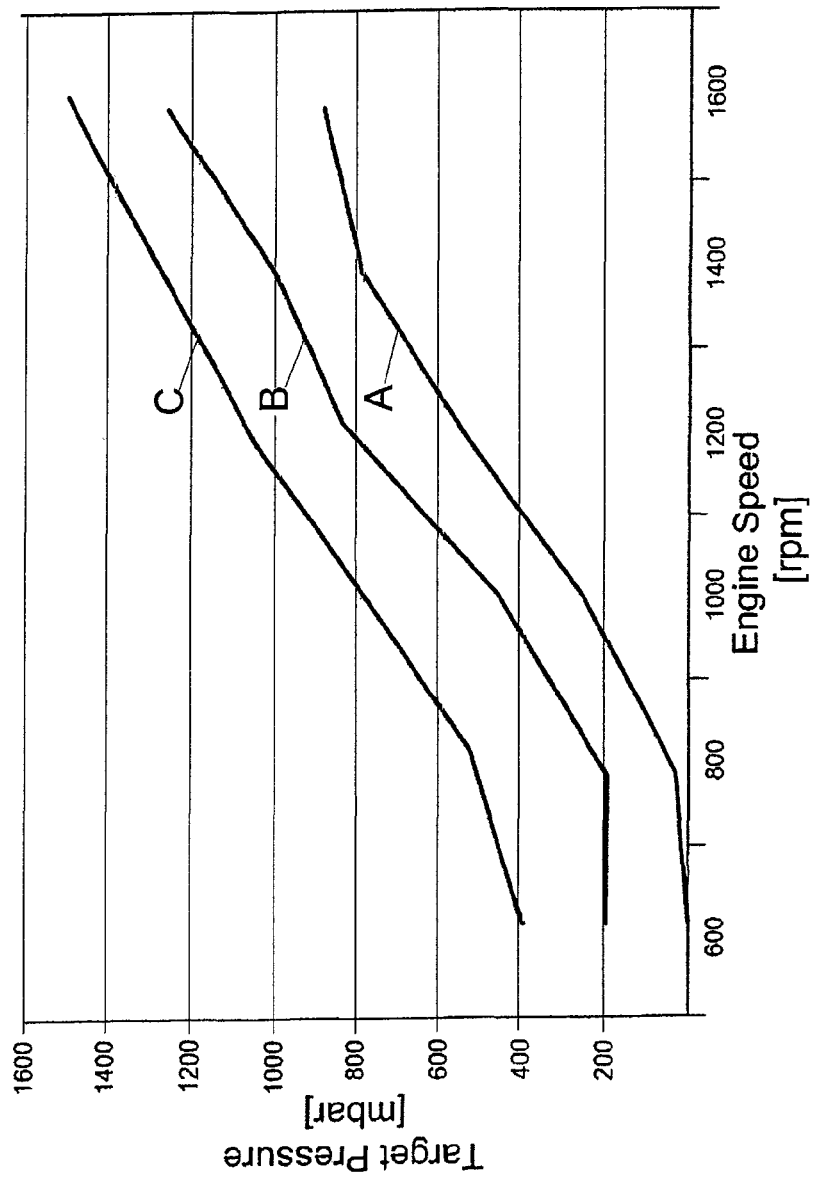
FIG. 13 is a graph illustrating operator-selectable vehicle performance profiles in accordance with an embodiment of the present invention.

A further feature of the present invention is the ability to use rate shaping to provide the operator with selectable alternative vehicle performance profiles choices. For example, an operator may be provided with the option of selecting vehicle performance options which trade one feature for another. An example is shown in FIG. 13. In this example, the operator may select (using, for example, a dash-mounted switch or an electronic touch screen controller) a performance profile which maximizes fuel economy at the expense of vehicle acceleration performance (curve A), maximizes the vehicle's dynamic response to an acceleration demand at the expense of fuel economy (curve C), or provides a compromise vehicle performance which is focused, in this example, on passenger comfort (curve B). Depending on the performance profile selected by the operator, the pneumatic booster controller 318 is applies the appropriate target pneumatic boost level limit associated with the selected curve A, B or C.

Figure 18:
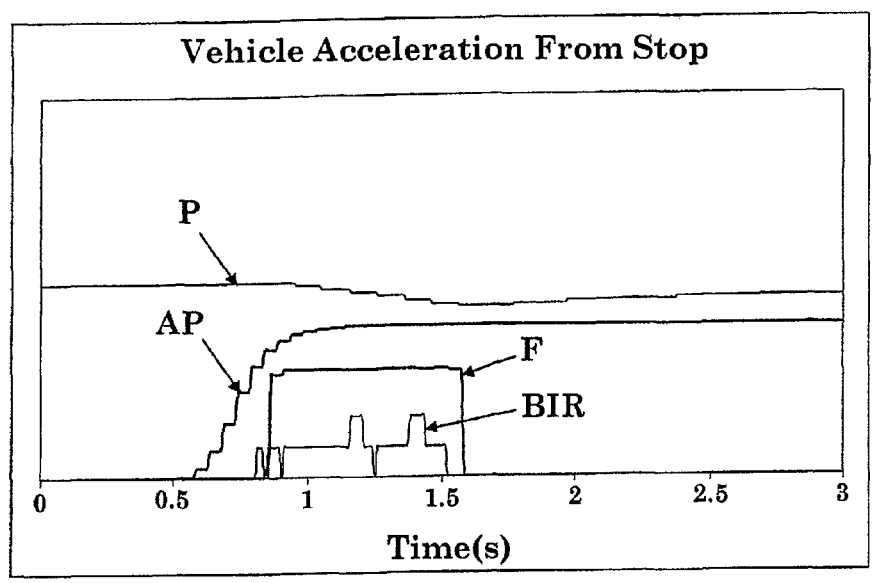
FIGS. 18-20 are graphs of various operating parameters and responses during a vehicle acceleration event.
Figure 19:
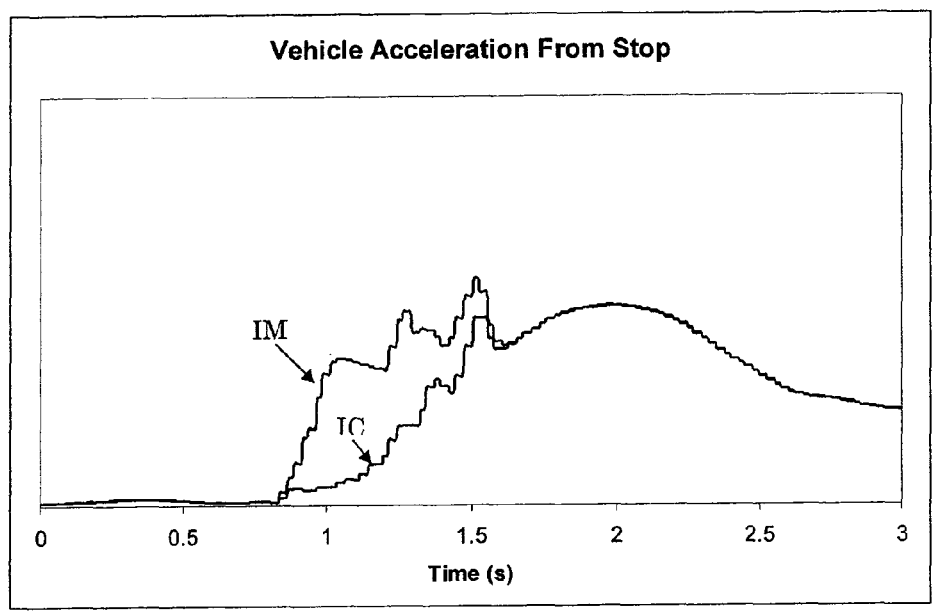
Figure 20:
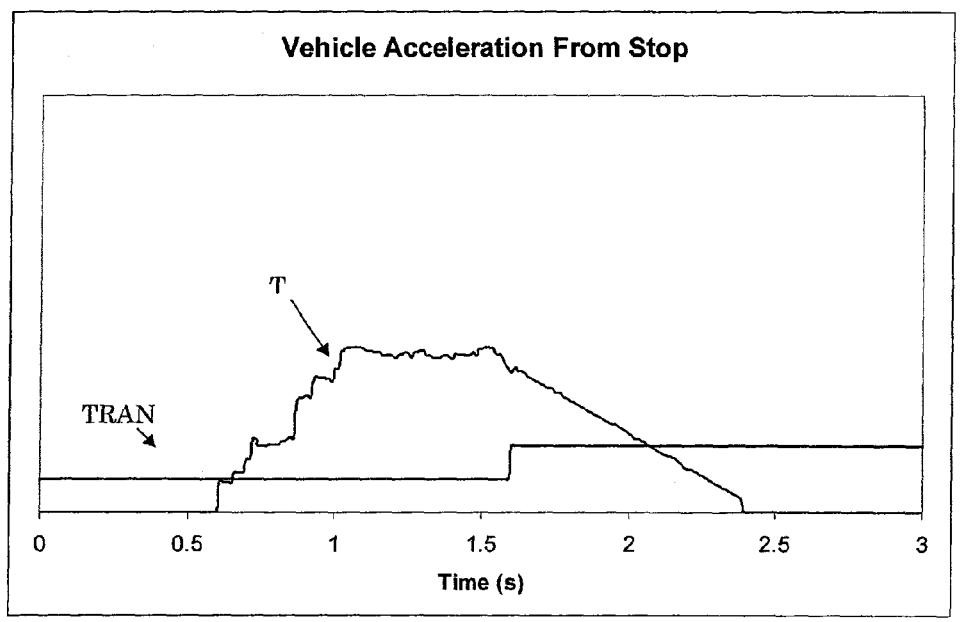

The following provides a quantitative example of a rate-shaped PBS-equipped vehicle's response to a boost event involving acceleration of an automatic or automated manual transmission equipped vehicle from a stopped position. As illustrated in FIGS. 18-20, the PBS controller executes a PBS control algorithm which monitors various vehicle operating parameter signals. For example, accelerator pedal position AP is monitored, with the driver's acceleration demand in determined from the accelerator pedal position value (line AP in FIG. 18). In this example, the accelerator pedal position changes from a value of 0% at time 0.54 seconds to 78% at time 0.81 seconds. Because the new value of the pedal position and the pedal position rate of change exceeds threshold values set for each, the PBS controller next determines whether the vehicle's air supply system for executing a pneumatic boost event has sufficient air pressure (line P in FIG. 18) to support initiating an injection event, i.e., whether there is sufficient available capacity to provide a desired mass of injection air. If the current value of the available air pressure is lower than a pre-determined threshold value, the PBS controller will not initiate an injection event. In FIG. 18 example, the available pressure is 129 psig, which is greater than this example's predetermined threshold value.

The PBS controller in this example next compares the status of a variety of other signals including engine speed, intake manifold pressure and driveline and clutch states and uses this vehicle operating information to determine whether a pneumatic boost injection event should occur. At time 0.80 seconds, the conditions monitored by the PBS controller have been determined to be satisfied, and the PBS controller issues control signals to initiate a boost injection event. The controller issues a signal to close the flap element (flap position line F in FIG. 18), and monitors its position as a check of hardware integrity.

As the throttle flap begins to close, the PBS controller sends another signal to one or more high speed solenoid air valves to initiate the compressed air injection, allowing air from the air supply reservoir to flow into the engine intake. The PBS controller can command any combination of air valves to activate, thereby shaping the injected air mass flow to match a targeted compressed air addition profile set by the PBS controller algorithms. This activity is represented in this example as a 'blow-in-request' (line BIR in FIG. 18), which is met by suitable actuation of the compressed air valves, e.g., issuing commands of '0' (neither solenoid), '1' (solenoid #1), '2' (solenoid #2) or '3' (both solenoid #1 and solenoid #2). During the injection, the intake manifold pressure between the flap element and engine intake system (line IM in FIG. 19) rapidly increases, while the pressure being delivered by the vehicle's turbocharger increases more gradually as pressure increases between the turbocharger compressor exit and the flap (line IC in FIG. 19).

In this example, the PBS controller determines when to cease a pneumatic boost injection event by monitoring the air pressure between the turbocharger compressor exit and throttle flap, as well as the pressure between the throttle flap and engine intake system. When the difference in pressures reaches a target value in the PBS controller, the controller determined that the turbocharger's output can take over the delivery of the air required by the engine, and therefore issues signals to cease boost air injection. In this example, at time 1.53 seconds the PBS controller sends signals to de-energize the activated air injection valve solenoids. The PBS controller also sends signals to open the flap element at time 1.57 seconds, and this fast-active flap reaches its fully open position at time 1.59 seconds.

During the course of the pneumatic boost injection event, the pressure in the PBS supply reservoir (line P in FIG. 18) begins to decrease as air is consumed during the injection. As can be discerned from FIG. 18, the supply system pressure, which started at 129 psi at time 0.81 seconds, decreases to 114 psig at time 1.54 seconds, when the air injection was discontinued.

In this example pneumatic boost injection event, the engine reaches a desired torque and/or engine speed sooner than when a pneumatic boost injection is not present. A common measure used in the art for comparing vehicle time-to-speed performance is the "T-90 Time," the time required for an engine to reach 90% of its maximum torque output from the time a torque demand is initiated via the accelerator pedal change in position. As shown in FIG. 20, the T-90 time with a pneumatic boost injection is 1.10 seconds, as shown by the torque output curve, line T in FIG. 20. The pneumatic boost injection air also allows the vehicle transmission to reach its next shift point more quickly than when a pneumatic boost injection is not present. In this example, the vehicle begins the pneumatic boost injection event in second gear, and the transmission controller (line TRANS in FIG. 20) calls for the next gear change near the end of the injection at time 1.59 seconds (line TRANS in FIG. 20).

The foregoing disclosure has been set forth merely to illustrate the invention and is not intended to be limiting. For example, while the foregoing disclosure refers to embodiments in which a vehicle engine is equipped with at least one turbocharger, the present invention is not limited to turbocharger-equipped engines, but instead may be applied to any other internal combustion engine configuration where controlled compressed air injection is desired to provide at least temporarily increased engine torque output. Such engine configurations include naturally-aspirated engines, supercharger-equipped engines, and engines operating on fuels other than diesel fuel, including gasoline-, hydrogen- and propane-fueled engines. Further, in the same manner that NOx emissions excursions may be avoided by use of rate-shaping of compressed air injections, a pneumatic booster controller in a pneumatic booster system of the present invention may also be programmed with information on engine and vehicle characteristics to permit rate shaping of compressed air injections to maintain other pollutants, such as $CO_2$ and/or particulate emissions, below required limits. Other embodiments would include operating of the pneumatic booster system in an open loop manner, for example, in accordance with a predetermined fixed rate-shaped compressed air injection profile, in accordance with a compressed air injection profile selected from a "look-up table" (i.e., a predetermined compilation of compressed air injection profiles stored in a memory of, for example, the pneumatic booster controller), and/or in accordance with a predetermined rate-shaped compressed air injection profile selected in response to a monitored vehicle operating parameter. Because such modifications of the disclosed embodiments incorporating the spirit and substance of the invention may occur to persons skilled in the art, the invention should be construed to include everything within the scope of the appended claims and equivalents thereof.

What is claimed is:

1. A system for increasing vehicle performance using pneumatic boosting, comprising:
    an engine having an intake, an exhaust and an exhaust gas recirculation passage for recirculation of a portion of exhaust gases from the engine from the exhaust to the intake;
    an air control device located in the intake, the air control device including
        an intake block-off element located in an intake passage of the air control device, the intake block-off element being arranged to move at least between open and closed positions to selectively block or allow air flow through the air control device toward the engine,
        at least one compressed air injection passage open to the intake on an engine side of the intake block-off element, the compressed air passage having at least one compressed air flow control valve arranged to modulate compressed air flow provided to the air control device into the intake, and a passage open to the intake on the engine side of the intake block-off element through which exhaust gases passing through the exhaust gas recirculation passage are introduced into the intake;

a compressed air source arranged to provide compressed air flow to the air control device;

a pneumatic booster injection controller;

wherein the pneumatic booster controller is programmed to control a pneumatic boost event based on at least one monitored operating parameter of the vehicle by coordinating the operation of the at least one compressed air flow control valve and the intake block-off element to supply compressed air to the engine via the intake, and the pneumatic booster injection controller is programmed to control the at least one compressed air flow control valve to provide the compressed air injection by adjusting at least two of compressed air injection rate, duration and timing of at least two air injection pulses during said pneumatic boost event so as to maintain the at least one monitored operating parameter of the vehicle within a predetermined range.

2. The system of claim 1, wherein
the pneumatic booster injection controller is configured to receive vehicle operating information from the vehicle prior to initiating the pneumatic boost event and to control the operation of the at least one compressed air flow control valve to adjust at least one of air injection rate, duration and timing for a first of the at least two compressed air injection pulses based on the received vehicle operating information.

3. The system of claim 1, wherein
the at least one operating parameter is a pressure of compressed air stored in a compressed air storage vessel, and
the predetermined range is a pressure higher than a minimum compressed air pressure required to ensure vehicle safety systems have sufficient compressed air available to perform the safety system function.

4. The system of claim 3, wherein
the vehicle safety system is an air brake system.

5. The system of claim 1, wherein
the at least one operating parameter is indicative of a NOx content in an exhaust gas from the engine, and
the predetermined range is an NOx content lower than a NOx emission limit.

6. The system of claim 1, wherein
the at least one operating parameter is indicative of a particulate matter content in an exhaust gas from the engine, and
the predetermined range is an particulate quantity lower than a particulate matter emission limit.

7. The system of claim 1, wherein
the at least one operating parameter is indicative of an EGR ratio, and
the predetermined range is an EGR ratio which is lower than an EGR ratio corresponding to exceeding a NOx emission limit.

8. The system of claim 1, wherein
the at least one operating parameter is a rotational speed of the engine, and
the predetermined range is an engine speed which is lower than an engine overspeed limit.

9. The system of claim 1, wherein
the at least one operating parameter is a rotational speed of a compressor of a turbocharger which supplies the engine with combustion air, and
the predetermined range is a turbocharger impeller speed which is lower than a turbocharger compressor overspeed limit.

10. The system of claim 1, wherein
the at least one operating parameter is a vehicle acceleration, and
the predetermined range is an acceleration which is lower than a maximum acceleration limit for maintaining passenger comfort in the vehicle.

11. The system of claim 1, wherein
the at least one operating parameter is a vehicle acceleration, and
the predetermined range is an acceleration rate which is lower than an operator-selectable acceleration profile.

12. The system of claim 1, wherein
the at least one operating parameter is an intake pressure, and
the predetermined range is a pressure below an intercooler over-pressure limit.

13. The system of claim 1, wherein
the at least one operating parameter is an exhaust gas temperature, and
the predetermined range is a temperature below a predetermined exhaust gas limit temperature.

14. The system of claim 1, wherein
the at least one operating parameter is an engine operating temperature, and
the predetermined range is a temperature above a predetermined minimum engine operating limit temperature.

15. The system of claim 1, wherein
the at least one operating parameter is a pressure downstream of a turbocharger compressor, and
the predetermined range is a pressure variation rate which is indicative of a turbocharger impeller speed variation being below a predetermined impeller speed variation corresponding to turbocharger surging.

16. The system of claim 1, wherein
the at least one operating parameter is an operating parameter of the vehicle indicative of an actual air flow rate in the intake, and
the predetermined range is a predetermined allowable difference between the actual air flow rate in the intake and an air flow rate demanded by at least one controller of the vehicle.

17. The system of claim 1, wherein
the at least one operating parameter is a driver acceleration request, and
the predetermined range is at least one of an accelerator pedal position and a frequency of accelerator position pedal exceeding a predetermined position.

18. The system of claim 1, wherein
the at least one operating parameter is a pressure at at least one of an inlet and an outlet of a pneumatic booster system compressed air injection module, and
the predetermined range is a predetermined allowable difference between the pressure at at least one of an inlet and an outlet of a pneumatic booster system compressed air injection module, and a pressure at at least one of the turbocharger compressor and a location in the intake downstream of the pneumatic booster system compressed air injection module.

19. The system of claim 1, wherein
the pneumatic booster injection controller is programmed to alter the compressed air injection by at least one of slowing, pausing and increasing a flow rate of the compressed air injection.

20. The system of claim 1, wherein
the pneumatic booster injection controller is programmed to adjust at least one of the compressed air injection rate, injection duration and injection timing to maintain the at least one operating parameter within the predetermined range by pulse-width modulation of at least one compressed air injection control device.

21. The system of claim 20, wherein
the at least one compressed air injection control device includes at least two compressed air flow control valves.

22. The apparatus of claim 21, wherein
the at least two compressed air flow control valves have different maximum air flow ratings, and
the at least two compressed air flow control valves are operable simultaneously and independently to obtain variable compressed air injection flow rates during the boost event.

23. A system for increasing vehicle performance using pneumatic boosting, comprising:
an engine having an intake, an exhaust and an exhaust gas recirculation passage for recirculation of a portion of exhaust gases from the engine from the exhaust to the intake;
an air control device located in the intake, the air control device including
an intake block-off element located in an intake passage of the air control device, the intake block-off element being arranged to move at least between open and closed positions to selectively block or allow air flow through the air control device toward the engine,
at least one compressed air injection passage open to the intake on an engine side of the intake block-off element, the compressed air passage having at least one compressed air flow control valve arranged to modulate compressed air flow provided to the air control device into the intake, and
a passage open to the intake on the engine side of the intake block-off element through which exhaust gases passing through the exhaust gas recirculation passage are introduced into the intake;
a compressed air source arranged to provide compressed air flow to the air control device; and
a pneumatic booster injection controller,
wherein the pneumatic booster injection controller is programmed to control the at least one compressed air flow control valve to provide the compressed air injection by adjusting at least two of compressed air injection rate, duration and timing of at least two air injection pulses during a pneumatic boost event.

24. The system of claim 23, wherein
the pneumatic booster injection controller is programmed to control the at least one compressed air flow control valve to provide the compressed air injection by adjusting at least two of compressed air injection rate, duration and timing of at least two air injection pulses during said pneumatic boost event in accordance with a predetermined compressed air injection profile.

25. The system of claim 23, wherein
the pneumatic booster injection controller is programmed to control the pneumatic boost event based on at least one monitored operating parameter of the vehicle by coordinating the operation of the at least one compressed air flow control valve and the intake block-off element to supply compressed air to the engine via the intake, and
the pneumatic booster injection controller is programmed to set the compressed air injection rate in accordance with the at least one monitored operating parameter.

26. The system of claim 25, wherein
the pneumatic booster injection controller is programmed to set the compressed air injection rate by reference to the at least one monitored operating parameter and a look-up table correlating the at least one operating parameter to predetermined compressed air injection rate profiles.

27. The system of claim 25, wherein
the pneumatic booster injection controller is programmed to set the compressed air injection rate in accordance with the at least one monitored operating parameter such that the pneumatic booster injection controller implements a predetermined pneumatic boost event profile which is different than an initial predetermined pneumatic boost event profile invoked at the initiation of the pneumatic boost event.

28. The system of claim 25, wherein
the at least one monitored operating parameter is a failure state of a vehicle component, and the pneumatic booster injection controller is programmed to adjust the compressed air injection rate in accordance with the monitored component failure state.

* * * * *